(12) United States Patent
Kumar et al.

(10) Patent No.: US 11,564,074 B2
(45) Date of Patent: Jan. 24, 2023

(54) GAP AND GATT ADAPTATION PROTOCOL OVER INTERNET PROTOCOL

(71) Applicant: ARRIS Enterprises LLC, Suwanee, GA (US)

(72) Inventors: Brajesh Kumar, Aligarh (IN); Jari T. Malinen, Santa Clara, CA (US); Dinesh Raman, Fremont, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/038,524

(22) Filed: Sep. 30, 2020

(65) Prior Publication Data

US 2021/0409923 A1    Dec. 30, 2021

Related U.S. Application Data

(60) Provisional application No. 63/046,488, filed on Jun. 30, 2020.

(51) Int. Cl.
*H04W 4/80*  (2018.01)
*H04L 12/46*  (2006.01)
*H04W 88/16*  (2009.01)

(52) U.S. Cl.
CPC .......... *H04W 4/80* (2018.02); *H04L 12/4633* (2013.01); *H04L 2212/00* (2013.01); *H04W 88/16* (2013.01)

(58) Field of Classification Search
CPC ..................................................... H04W 4/80
See application file for complete search history.

(56) References Cited

U.S. PATENT DOCUMENTS

| 10,791,132 | B1 | 9/2020 | Power et al. | |
| 2015/0351145 | A1* | 12/2015 | Burks | H04W 4/80 455/41.3 |
| 2017/0006643 | A1* | 1/2017 | Zakaria | H04W 12/50 |

(Continued)

OTHER PUBLICATIONS

"Notification of Transmittal of the International Search Report and the Written Opinion of the International Searching Authority, or the Declaration for corresponding International Application No. PCT/US2021/037423, dated Sep. 15, 2021 (17 pages)".

*Primary Examiner* — Wen W Huang
(74) *Attorney, Agent, or Firm* — Steven Stupp; Stewart Wiener

(57) ABSTRACT

In a second group of embodiments, an electronic device that provides a virtual Bluetooth gateway is described. During operation, the electronic device may receive a first packet associated with a second electronic device and that has an Internet Protocol (IP)-compatible format (such as a JavaScript Object Notation or JSON format). Then, the electronic device may de-encapsulate a second packet from the first packet, where the second packet is compatible with a Bluetooth communication protocol. Next, the electronic may provide the second packet. Note that the electronic device may not include a physical Bluetooth radio, such as dedicated hardware for a physical Bluetooth radio. Instead, the electronic device may include a virtual Bluetooth device that communicates with the second electronic device via the virtual Bluetooth gateway. This virtual Bluetooth device may have the capabilities of a physical Bluetooth radio (without the dedicated hardware).

20 Claims, 14 Drawing Sheets

(56) References Cited

U.S. PATENT DOCUMENTS

| | | | |
|---|---|---|---|
| 2017/0064042 A1 | 3/2017 | Vora et al. | |
| 2017/0201499 A1* | 7/2017 | McLaughlin | H04L 63/0428 |
| 2017/0344577 A1* | 11/2017 | Nagasaki | A61B 5/00 |
| 2017/0374490 A1* | 12/2017 | Schoppmeier | H04W 4/70 |
| 2019/0306267 A1 | 10/2019 | Lee et al. | |
| 2019/0334995 A1* | 10/2019 | Shanmugam | H04W 4/12 |
| 2019/0342737 A1 | 11/2019 | Lin et al. | |
| 2020/0053007 A1 | 2/2020 | Slevinsky et al. | |
| 2020/0177517 A1* | 6/2020 | Pancras | H04L 47/6295 |
| 2021/0160213 A1* | 5/2021 | Dees | H04L 69/08 |
| 2021/0314407 A1* | 10/2021 | Ng | G06N 5/027 |

\* cited by examiner

GAP AND GATT ADAPTATION PROTOCOL OVER INTERNET PROTOCOL

CROSS REFERENCE TO RELATED APPLICATIONS

This application claims priority under 35 U.S.C. 119(e) to: U.S. Provisional Application Ser. No. 63/046,488, "Dynamic Data-Driven Generation of IoT Applications," filed on Jun. 30, 2020, by Jari T. Malinen, et al., the contents of which are herein incorporated by reference.

BACKGROUND

Field

The described embodiments relate to techniques for communication. Notably, the described embodiments relate to techniques for de-encapsulating vendor-specific a general access profile (GAP) packet and/or a general attribute profile (GATT) packet associated with a Bluetooth application from a vendor-independent packet that has an Internet Protocol (IP)-compatible format, such as a JavaScript Object Notation (JSON) format.

Related Art

The increasing capabilities of electronic devices are dramatically changing our lives. For example, the processing and communication capabilities of portable electronic devices, such as cellular telephones, provide users with the capabilities of a handheld computer. In conjunction with expanded networks, such as the cellular-telephone networks and the Internet, these capabilities are allowing individuals to: access vast amounts of information; identify and interact with other people, organizations and governments; access information at arbitrary locations; and/or perform a wide variety of tasks. Collectively, these technologies have resulted in a significant increase in economic activity (such as online financial transactions, which are sometimes referred to as 'ecommerce') and productivity, and enable a host of applications that enhance user experiences and quality of life.

Recently, it has been proposed that further advances can be achieved by enhancing the capabilities of other electronic devices, which are pervasive but largely ignored by most users (such as in appliances, infrastructure, transportation, farming, etc.). Notably, by embedding sensors, actuators and communication capabilities in these 'background' electronic devices, the so-called 'Internet of things' (IoT) can provide a distributed network that facilities the exchange of data, remote sensing and control, and a diverse set of applications that facilitate more direct integration of the physical world into computer-based systems. In principle, the IoT offers the promise of highly automated systems that improve efficiency, enhance accuracy and expand economic activity in a diverse set of markets, such as: smart cities, hospitality, retail, education, housing, and manufacturing.

In practice, there are still obstacles to achieving the goals of the IoT. Notably, the IoT marketplace is diverse, with competing commercial entities offering devices/endpoints, networks, middleware and cloud-based platforms and services. Moreover, the marketplace lacks interoperability standards, which restricts communication and the exchange of data among components in these systems. The resulting lack of coordination can make it difficult to scale IoT systems while maintaining or ensuring quality of service.

Consequently, the IoT remains fragmented and siloed, which forces users to purchase additional dedicated equipment (such as separate gateways for electronic devices from different manufacturers and providers, and/or additional network switches to connect to different cloud-based service providers) in an attempt to build integrated solutions. However, these efforts often result in custom (e.g., vendor-specific) and expensive solutions with redundant equipment, limited flexibility and difficulty in scaling to large deployments, all of which is frustrating to users and limits market traction of the IoT.

SUMMARY

In a first group of embodiments, an electronic device that dynamically generates an application is described. This electronic device may include: an interface circuit; a display; a user-interface device; a processor; and memory that stores program instructions. During operation, the electronic device may receive, at the interface circuit, instructions for a user interface, where the user interface includes selectable user-interface objects associated with predefined component blocks or modules and information specifying or corresponding to predetermined or predefined data patterns associated with communication associated with a second electronic device, an access point and a gateway. Then, the electronic device may display, on the display, the user interface. Moreover, the electronic device may receive, at the user-interface device, information specifying user-interface activity, where the user-interface activity specifies selections of at least a subset of the predefined component blocks or modules. Furthermore, the electronic device may provide, from the interface circuit, the information addressed to a third electronic device.

Note that the predefined component blocks or modules may be based at least in part on the predetermined or predefined data patterns.

Moreover, the predefined component blocks or modules may include one or more sets of program instructions.

Furthermore, the user interface may include metadata associated with the predefined component blocks or modules. For example, for a given predefined component block or module, the metadata may specify one or more internal functions and one or more interconnections to one or more other components.

Additionally, the data patterns may include communication operations and data-transformation operations performed by one or more of the second electronic device, the access point or the gateway.

Note that the data patterns may specify an order and/or an interrelationship of the predefined component blocks or modules.

In some embodiments, the selections specify bidirectional communication among two or more of the second electronic device, the access point and the gateway.

Moreover, the selections may specify multiple threads or processes, where a given thread is associated with a subset of the predefined component blocks or modules based at least in part on resource limitations of one or more of the second electronic device, the access point or the gateway.

Furthermore, the user interface may specify communication performance associated with the selections based at least in part on a service level agreement.

Another embodiment provides a user interface that facilitates dynamic generation of an application in one or more of the preceding embodiments.

Another embodiment provides an access point or a gateway that performs counterpart operations to those performed by the electronic device in one or more of the preceding embodiments.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a second group of embodiments, an electronic device that dynamically generates an application using predefined component blocks or modules (e.g., one or more sets of program instructions) based at least in part on data patterns associated with communication is described. This electronic device includes: a network node; an interface circuit that is communicatively coupled to the network node; a processor; and memory that stores program instructions, where, when executed by the processor, the program instructions cause the electronic device to perform one or more operations. Notably, during operation, the electronic device may access information that specifies communication associated with a second electronic device, an access point and a gateway. Then, the electronic device may analyze the information to determine the data patterns associated with the communication. Next, the electronic device may dynamically generate the application using the predefined component blocks or modules based at least in part on the determined data patterns and metadata associated with the predefined component blocks or modules.

Note that the data patterns may include communication operations and data-transformation operations performed by one or more of the second electronic device, the access point or the gateway. In some embodiments, the data patterns may specify an order, an interrelationship or both of the predefined component blocks or modules. Note that the data patterns may include configurations of one or more of the second electronic device, the access point or the gateway.

Moreover, the electronic device may provide, from the interface circuit, the application addressed to the access point or the gateway.

Furthermore, the application may include bidirectional communication among two or more of the second electronic device, the access point and the gateway. Additionally, the application may include multiple threads or processes, where a given thread is associated with a subset of the predefined component blocks or modules based at least in part on resource limitations of the second electronic device, the access point and/or the gateway.

In some embodiments, the application is dynamically generated based at least in part on parameters associated with a service. For example, the parameters may be associated with a service level agreement, such as a specified communication performance.

Note that, for a given predefined component block or module, the metadata may specify one or more internal functions and one or more interconnections to one or more other components.

Moreover, dynamically generating the application may involve: providing, from the interface circuit, a user interface that specifies the predefined component blocks or modules and the data patterns; and receiving, at the interface circuit, user-interface activity that specifies selections from the predefined component blocks or modules and the data patterns, where the application may be dynamically generated based at least in part on the specified selections.

Furthermore, accessing the information may involve: receiving, at the interface circuit, the information; or determine the information by monitoring the communication.

Another embodiment provides an access point or a gateway that performs counterpart operations to those performed by the electronic device in one or more of the preceding embodiments.

Another embodiment provides a user interface that facilitates dynamic generation of an application in one or more of the preceding embodiments.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a third group of embodiments, an electronic device that provides a virtual Bluetooth gateway is described. This electronic device includes: a network node; an interface circuit that is communicatively coupled to the network node and that communicates with a second electronic device; a processor; and memory that stores program instructions, where, when executed by the processor, the program instructions cause the electronic device to perform one or more operations. Notably, during operation, the electronic device may receive a first packet associated with the second electronic device and that has an IP-compatible format. Then, the electronic device may de-encapsulate a second packet from the first packet, where the second packet is compatible with a Bluetooth communication protocol. Next, the electronic may provide the second packet.

Note that the electronic device may not include a physical Bluetooth radio, such as dedicated hardware for a physical Bluetooth radio. Instead, the electronic device may include a virtual Bluetooth device that communicates with the second electronic device via the virtual Bluetooth gateway. This virtual Bluetooth device may have the capabilities of the physical Bluetooth radio (without the dedicated hardware).

Furthermore, the second packet may be associated with a Bluetooth application.

Additionally, the first packet may have a JSON format.

In some embodiments, the second packet may include a GAP packet or a GATT packet, such as a vendor-specific GAP packet or a vendor-specific GATT packet associated with the Bluetooth application.

Moreover, the electronic device may receive a third packet that is compatible with the Bluetooth communication protocol. Then, the electronic device may encapsulate the third packet in a fourth packet that has the IP-compatible format. Next, the electronic may provide the fourth packet addressed to the second electronic device.

Furthermore, the virtual Bluetooth gateway may support a set of vendor-independent Bluetooth operations that facilitate communication with a vendor-specific Bluetooth application. For example, the virtual Bluetooth gateway may provide application programming interfaces (APIs) for the set of vendor-independent Bluetooth operations. This capability may facilitate remote discovery of attributes or characteristics associated with the second electronic device using, e.g., the vendor-specific GAP packet or the vendor-specific GATT packet that is communicated in the vendor-independent first packet using the IP-compatible format.

Note that the Bluetooth communication protocol may include Bluetooth Low Energy (BLE).

In some embodiments, the first packet and/or the fourth packet is communicated using a Message Queuing Telemetry Transport (MQTT) communication protocol.

Another embodiment provides the second electronic device, which performs counterparts to at least some of the aforementioned operations in one or more of the preceding embodiments.

Another embodiment provides a computer-readable storage medium with program instructions for use with the electronic device or the second electronic device. When executed by the electronic device or the second electronic device, the program instructions cause the electronic device or the second electronic device to perform at least some of the aforementioned operations in one or more of the preceding embodiments.

Another embodiment provides a method, which may be performed by the electronic device or the second electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
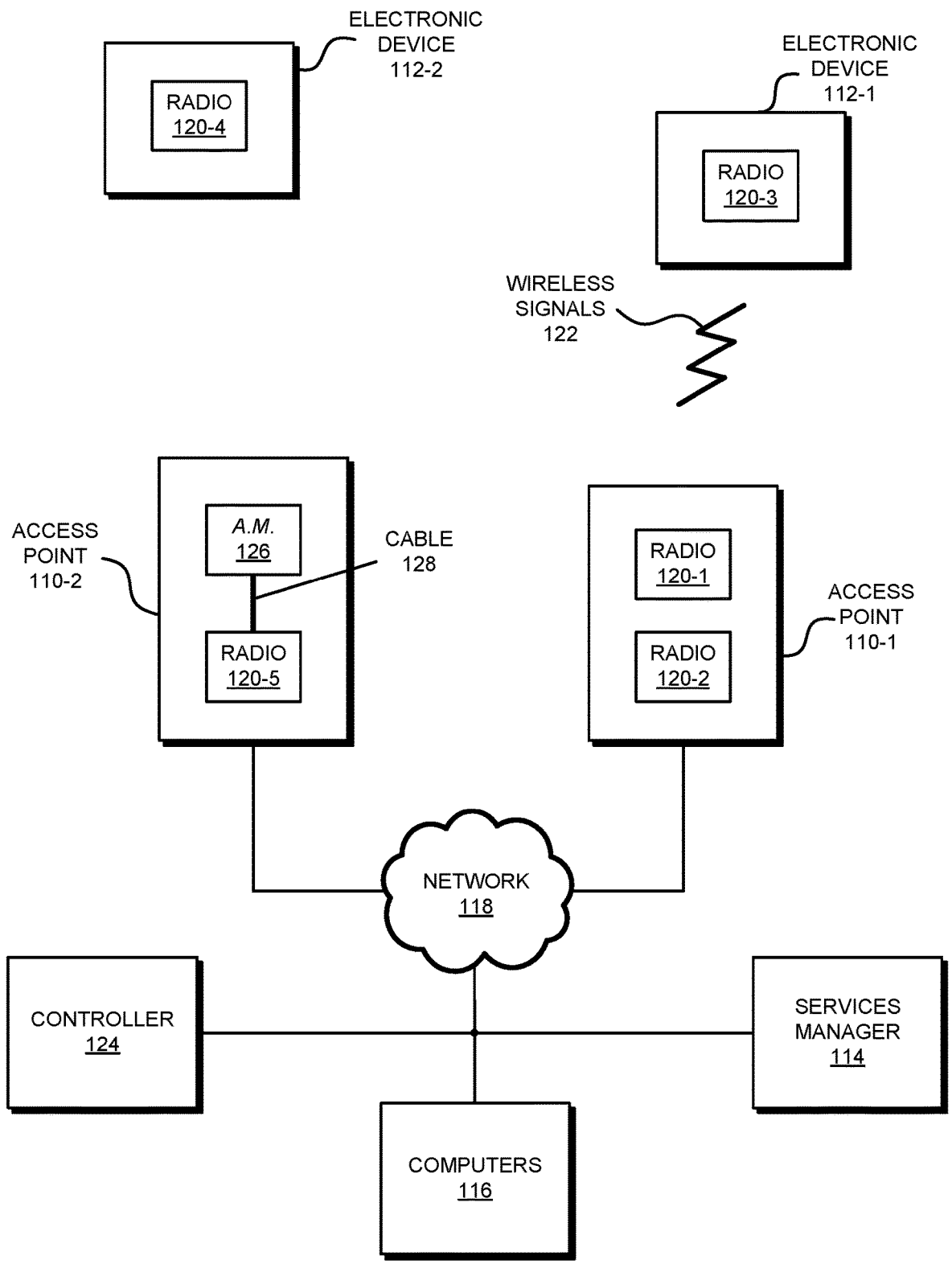
FIG. 1 is a block diagram illustrating an example of communication among electronic devices in accordance with an embodiment of the present disclosure.

In a first group of embodiments, an electronic device that dynamically generates an application is described. During operation, the electronic device may receive instructions for a user interface, where the user interface includes selectable user-interface objects associated with predefined component blocks or modules and information specifying or corresponding to predetermined or predefined data patterns associated with communication associated with a second electronic device, an access point and a gateway. Then, the electronic device may display the user interface. Moreover, the electronic device may receive information specifying user-interface activity, where the user-interface activity specifies selections of at least a subset of the predefined component blocks or modules. Furthermore, the electronic device may provide, from the interface circuit, the information addressed to a third electronic device.

By dynamically generating the application, these communication techniques may allow application(s) to be generated on the fly based at least in part on user selections of at least the subset of the predefined component blocks or modules. Moreover, the predefined component blocks or modules may reflect dynamically changing conditions. For example, the predefined or predetermined data patterns may specify operations performed by the second electronic device, the access point and/or the gateway. As the operations or associated performance change, the applications may be adapted. Thus, the predefined or predetermined data patterns may impact the predefined component blocks or modules and, thus, may specify how the application(s) are assembled. This capability may allow the application(s) to be reliably generated from the predefined component blocks or modules, while maintaining or ensuring desired functionality. Moreover, the communication technique may allow the application(s) to be generated at scale, such as in large deployments. Consequently, the communication techniques may improve the user experience and may enable the IoT.

In a second group of embodiments, an electronic device that dynamic generates an application using predefined component blocks or modules (e.g., one or more sets of program instructions) based at least in part on data patterns associated with communication is described. During operation, the electronic device may access information that specifies communication associated with a second electronic device (such as an IoT device), an access point and a gateway. For example, the electronic device may receive the information or may determine the information by monitoring the communication. Then, the electronic device may analyze the information to determine the data patterns associated with the communication. Next, the electronic device may dynamically generate the application using the predefined component blocks or modules based at least in part on the determined data patterns and metadata associated with the predefined component blocks or modules.

By dynamically generating the application, these communication techniques may allow application(s) to be generated on the fly based at least in part on dynamically changing conditions. For example, the data patterns may specify operations performed by the second electronic device, the access point and/or the gateway. As the operations or associated performance change, the application(s) may be adapted. Thus, the data patterns may specify how the application(s) are assembled. This capability may allow the application(s) to be reliably generated from the predefined component blocks or modules, while maintaining or ensuring desired functionality. Moreover, the communication technique may allow the application(s) to be generated at scale, such as in large deployments. Consequently, the communication techniques may improve the user experience and may enable the IoT.

In a third group of embodiments, an electronic device that provides a virtual Bluetooth gateway is described. During operation, the electronic device may receive a first packet associated with a second electronic device and that has an IP-compatible format (such as a JSON format). Then, the electronic device may de-encapsulate a second packet from the first packet, where the second packet is compatible with a Bluetooth communication protocol. Next, the electronic may provide the second packet. Note that the electronic device may not include a physical Bluetooth radio, such as dedicated hardware for a physical Bluetooth radio. Instead, the electronic device may include a virtual Bluetooth device that communicates with the second electronic device via the virtual Bluetooth gateway. This virtual Bluetooth device may have the capabilities of a physical Bluetooth radio (without the dedicated hardware).

By de-encapsulating (and encapsulating) packets from (and to) the second electronic device, these communication techniques may allow the electronic device to flexibly communicate with the second electronic device. Notably, the electronic device may not need to perform vendor-specific or custom translation of packets from (or to) a vendor-specific Bluetooth application executing on the second electronic device. Moreover, the use of the IP-compatible format may ensure that the second packet is recovered from the first packet without requiring a customized translation technique. Furthermore, a second application (such program instructions or program modules), which execute higher in a software stack of the electronic device or in another electronic device, may therefore be able to receive and access the payload or contents of the second packet. Consequently, the communication techniques may allow applications to be flexibly generated at scale, such as in large deployments. Therefore, the communication techniques may improve the user experience and may enable the IoT.

In the discussion that follows, electronic devices (such as an access point or an eNodeB) communicate frames or packets in accordance with one or more wireless communication protocol, such as an IEEE 802.11 standard (which is sometimes referred to as 'Wi-Fi,' from the Wi-Fi Alliance of Austin, Tex.), Bluetooth (from the Bluetooth Special Interest Group of Kirkland, Wash.), BLE (from the Bluetooth Special Interest Group of Kirkland, Wash.), Zigbee (from the Zigbee Alliance of Davis, Calif.), Z-Wave (from Sigma Designs, Inc. of Fremont, Calif.), LoRaWAN (from the Lora Alliance of Beaverton, Oreg.), Thread (from the Thread Group of San Ramon, Calif.), IPv6 over low-power wireless personal area networks or 6LoWPAN (from the Internet Engineering Taskforce of Fremont, Calif.) and/or another type of wireless interface. In the discussion that follows, Wi-Fi, Zigbee and BLE are used as illustrative examples. However, a wide variety of communication protocols (such as Long Term Evolution or LTE, another cellular-telephone communication protocol, etc.) may be used.

Moreover, the access point or eNodeB may communicate with other access points, eNobdeBs and/or computers in a network using a wired communication protocol, such as an IEEE 802.3 standard (which is sometimes referred to as 'Ethernet'), MQTT and/or another type of wired interface. In the discussion that follows, MQTT and Ethernet are used as illustrative examples.

FIG. 1 presents a block diagram illustrating an example of communication among one or more access points 110, one or more electronic devices 112 (such as a cellular telephone), a services manager 114, and one or more computers 116 associated with service providers (or third parties, which are sometimes referred to as 'providers') in accordance with some embodiments. Notably, access points 110 may communicate with each other and other components in FIG. 1 using wireless and/or wired communication. Note that access points 110 may include a physical access point and/or a virtual access point that is implemented in software in an environment of an electronic device or a computer. Furthermore, at least some of access points 110 may communicate with electronic devices 112 using wireless communication.

The wired communication among access points 110 and other components (such as services manager 114) may occur via network 118 (such as an intra-net, a mesh network, point-to-point connections and/or the Internet) and may use a network communication protocol, such as Ethernet or MQTT. Moreover, the wireless communication using Wi-Fi or another wireless communication protocol (such as BLE or Zigbee) may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, wireless communication by access points 110 also involves the use of dedicated connections, such as via a peer-to-peer (P2P) communication techniques.

Figure 14:
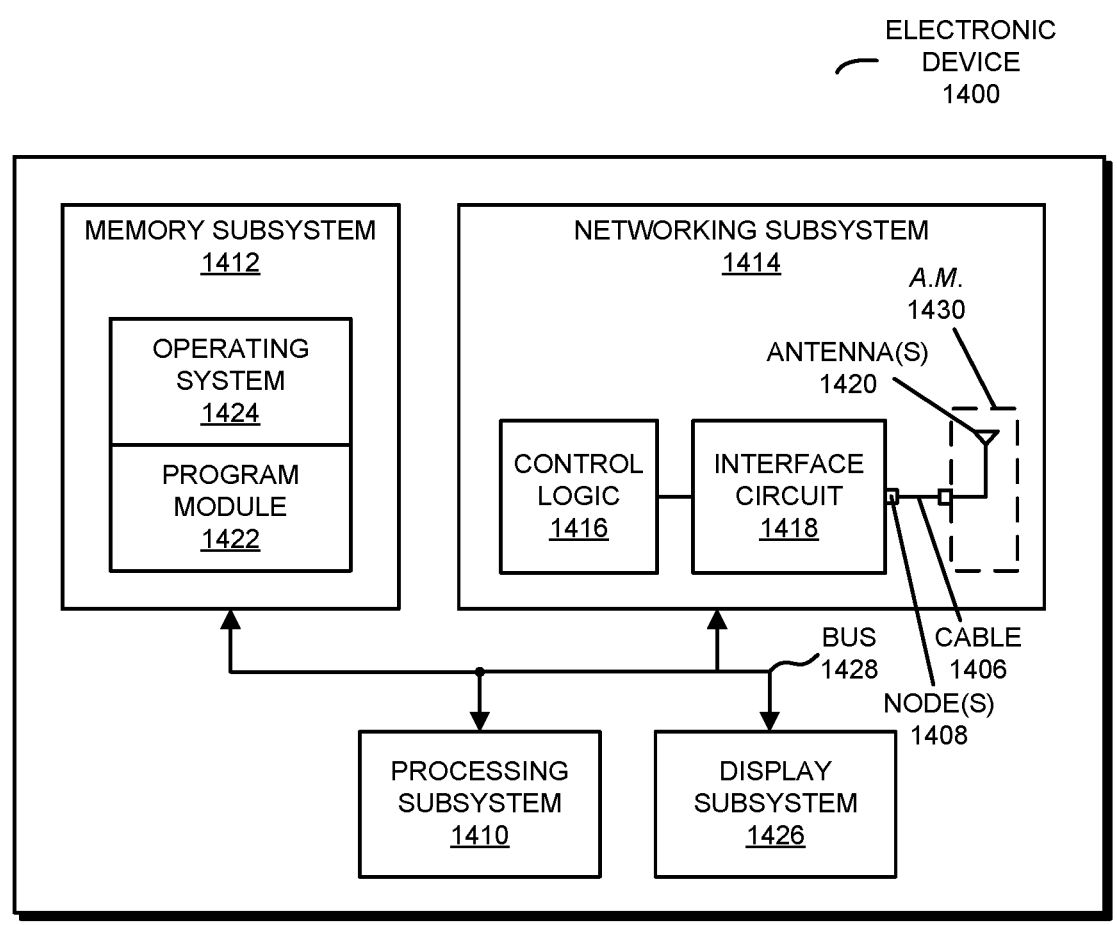
FIG. 14 is a block diagram illustrating an example of an electronic device in accordance with an embodiment of the present disclosure.

As described further below with reference to FIG. 14, access points 110, electronic devices 112, services manager 114 and/or computers 116 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120. In some embodiments, such as in access point 110-2, radio 120-5 is coupled to a separate antenna module (A.M.) 126 by a cable 128.

As can be seen in FIG. 1, wireless signals 122 (represented by a jagged line) are transmitted from radios 120-1 and/or 120-2 in access point 110-1. These wireless signals may be received by radio 120-3 in electronic device 112-1. Notably, access point 110-1 may transmit frames or packets. In turn, these frames or packets may be received by electronic device 112-1. Moreover, access point 110-1 may allow electronic device 112-1 to communicate with other electronic devices, computers and/or servers via network 118.

Note that the communication between at least pairs of components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIG. 2, one of access points 110 (such as access point 110-1) may perform at least some aspects of the communication techniques. This may allow access points 110 to become one-touch points of access to the IoT using a single framework. Notably, access points 110 may facilitate the dynamic integration of multiple electronic devices and service providers in a variety of applications, as well as easy deployment and upgrades.

In some embodiments, access point 110-1 may provide co-existing or concurrent communication using different communication protocols. Notably, access point 110-1 may include radio 120-1 and/or 120-2. These radios may, respectively, communicate using different communication protocols in a shared band of frequencies (such as the 2.4 GHz ISM band of frequencies). For example, radio 120-1 may be a BLE radio and radio 120-2 may be a Wi-Fi radio (or vice versa). During operation, radio 120-2 may perform a scan of available channels in the shared band of frequencies. Radio 120-2 may detect or determine that BLE and Wi-Fi may each use one of primary channels 1, 6 and 11 (such as channel 1). Alternatively, radio 120-2 may receive, from radio 120-1 (if access point 110-1 includes radio 120-1), information specifying one or more used channels in the shared band of frequencies that are reserved or used by the BLE communication protocol. Next, radio 120-2 may mask the one or more used channels from the available channels (such as by masking out 8-16 MHz corresponding to primary channel 1), and radio 120-2 may select one or more channels from remaining available channels for use with the Wi-Fi communication protocol, such as a new primary channel. Thus, because Wi-Fi has the ability to hop among different channels while BLE and Zigbee typically do not hop, channel masking may be used to facilitate co-existing and/or concurrent communication among access points 110 and electronic devices 112 using two different communication protocols in the shared band of frequencies.

While access point 110-1 is illustrated with separate radios 120-1 and 120-2, in some embodiments these radios are combined into a single radio or integrated circuit. Alternatively or additionally, packet-traffic arbitration between radios 120-1 and 120-2 may be used. Notably, when one of the radios is transmitting or receiving using a channel and a first communication protocol, it may communicate a hold (such as a hold signal or instruction) to the other radio, so that the other radio temporarily does not communicate using the channel and a second communication protocol.

In some embodiments, additional communication capability is added to access point 110-1 via a plug-in module, such as a dongle (which is sometimes referred to as a 'USB dongle') that is inserted into a USB port in access point 110-1. For example, radio 120-1 may be a USB dongle that adds BLE communication capability to access point 110-1. In conjunction with software on access point 110-1, this may enable communication-protocol recognition and translation, as well as communication via another communication protocol (as was just described).

Moreover, as described further below with reference to FIGS. 3 and 4, additional infrastructure may perform or implement at least some aspects of the communication techniques. Notably, services manager 114 may enable dynamic integrated solutions with disparate (and otherwise potentially incompatible) components, such as one or more sensors (which are sometimes referred to as an 'IoT device') and/or actuators from different manufacturers (which are sometimes referred to as an 'IoT device'), and/or one or more service providers. These different components may be associated with different (unrelated) entities, such as different companies or organizations. Note that in the present discussion an 'IoT device' may have a sensing capability and/or an actuation capability.

Notably, services manager 114 may include: a gateway that communicates with one or more of access point 110 via a communication protocol (such as MQTT); a control and management plane with system-configuration information; and a data plane with a registry of the one or more electronic devices 112, rules for the one or more electronic devices 112, and APIs for service providers. Services manager 114 may provide a programmable, modular and integrated system for flexibly and securely exchanging data and associated services among access points 110, electronic devices 112, services manager 114 and computers 116. Note that resources in services manager 114 that are associated with different service providers may be contained in separate virtual machines. Alternatively or additionally, the resources from different service providers may be included in 'containers' (such as docker containers). Furthermore, the control and management plane and the data plane may be implemented in separate software stacks in services manager 114.

In some embodiments, optional controller 124 is used to configure settings of access points 110, such as transmit power, a transmit antenna pattern, a receive antenna pattern, etc. Thus, controller 124 may provide Wi-Fi control and management planes. Moreover, controller 124 may initialize IoT services that are facilitated and managed by services manager 114, i.e., services manager 114 may provide IoT data plane and control and management plane. In addition, services manager 114 may provide a partner portal for Wi-Fi and IoT management by one or more of computers 116. Note that in some embodiments, controller 124 may be combined with services manager 114 in a single device. Alternatively, controller 124 may implement at least some of the functionality of services manager 114 (and/or vice versa). Furthermore, note that controller 124 and/or services manager 114 may be local devices where access points 110 and electronic devices 112 are installed and used, or may be at a remote location (such as a cloud-based implementation).

In these ways, the communication techniques may enable the IoT. Notably, access points 110 and services manager 114 may provide a single-access network for Wi-Fi and IoT traffic. Access points 110 and services manager 114 may: manage network across different physical layers, provide IoT device-to-backend management, and/or distributed decision-making (such as at the edge immediately behind a firewall versus backend processing). Moreover, access points 110 and services manager 114 may be: transport protocol agnostic, architecture agnostic to the transport layer, and/or may support a variety of communication or transport protocols, such as Zigbee, BLE and/or other IoT communication protocols. Furthermore, access points 110 and services manager 114 may: provide a network backbone for a variety of services, enable end-to-end services for multiple connected ecosystems, and/or provide end-to-end solutions with a simplified value chain and a single network.

Moreover, the communication techniques may allow access points 110 and/or services manager 114 to provide flexible and secure exchange of data and the associated services. For example, the communication techniques may remove siloes between components from different manufacturers and providers (such as local electronic devices that provide IoT devices and actuators and service providers), and may facilitate dynamic services for customers (such as services that are configured and provided as needed). Furthermore, services manager 114 may facilitate interoperability of disparate components from different manufacturers and providers without requiring a standard or retrofitting of legacy equipment. Additionally, services manager 114 may eliminate the need for additional (and expensive) dedicated equipment (such as separate gateways for electronic devices from different manufacturers and/or additional network switches to connect to different cloud-based service providers). Thus, services manager 114 may enable integrated solutions and the IoT, which may allow a wide variety of valued-added applications and services, enhanced economic activity and enhanced user experiences and customer satisfaction.

Figure 7:
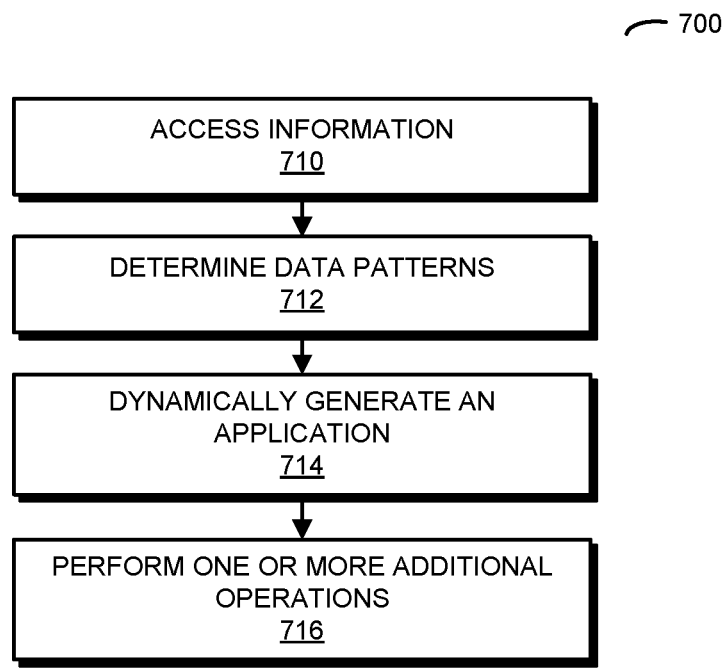
FIG. 7 is a flow diagram illustrating an example of a method for dynamically generating an application in accordance with an embodiment of the present disclosure.

Furthermore, as described further below with reference to FIGS. 7-9, services manager 114 or another electronic device (such as one of computers 116) may dynamically generate an application for use with at least one of access points 110 and/or services manager 114. This application may include predefined component blocks or modules (e.g., one or more sets of program instructions) in one or more of access points 110 and/or services manager 114 to provide particular functionality based at least in part on communication among at least one of electronic devices 112, at least one of access points 110 and/or services manager 114, and/or data-transformation operations performed by at least one of electronic devices 112, at least one of access points 110 and/or services manager 114. Notably, the application may be dynamically generated based at least in part on data patterns that are determined by analyzing the communication among at least one of electronic devices 112, at least one of access points 110 and/or a gateway (such as the gateway in services manager 114). In some embodiments, the data patterns may specify an order, an interrelationship or both of the predefined component blocks or modules. Note that the data patterns may include configurations of one or more of the second electronic device, the access point or the gateway. Moreover, the application may be dynamically generated based at least in part on associated with the predefined component blocks or modules. For example, for a given predefined component block or module, the metadata may specify one or more internal functions and one or more interconnections to one or more other components. Additionally, the application may be dynamically generated based at least in part on parameters associated with a service, such as a service level agreement that specifies a communication performance (e.g., a throughput, a latency, a number of clients, etc.). After the application is generated, services manager 114 or the other electronic device may provide the application to at least the one of access points 110 or the gateway.

In these ways, the communication techniques may allow the application to be dynamically (or on the fly) generated using building blocks (such as the component blocks or modules) using information (such as the metadata) about capabilities and interrelationships of the building blocks and measured data patterns. These capabilities may allow a variety of integrated applications or different instances of an application to be generated, which may allow scalable integrated solutions to be reliably created (e.g., by maintaining desired functionality). Thus, the communication techniques may reduce the time, cost and complexity of developing integrated applications, which may improve the performance and the user experience. Consequently, the communication techniques may facilitate the IoT.

Additionally, as described further below with reference to FIGS. 10-12, services manager 114 may provide a virtual Bluetooth gateway. Notably, an electronic device (such as electronic device 112-1) may provide a first packet that is compatible with a Bluetooth communication protocol (such as BLE) to services manager 114 via one of access points 110 (such as access point 110-1). For example, the first packet may be communicated using the Bluetooth communication protocol. Access point 110-1 may provide a virtual Bluetooth gateway that encapsulates the first packet in a second packet that has an IP-compatible format, such as a JSON format. Moreover, access point 110-1 may provide the second packet to services manager 114. Note that the first packet may be communicated with a MQTT communication protocol.

Then, services manager 114 may receive a second packet associated with electronic device 112-1. Furthermore, services manager 114 may de-encapsulate the first packet from the second packet. Note that the first packet may be associated with a Bluetooth application, such as a Bluetooth application that executes on electronic device 112-1. In some embodiments, the first packet may include a GAP packet or a GATT packet, such as a vendor-specific GAP packet or a vendor-specific GATT packet associated with the Bluetooth application, which, respectively, may include GAP or GATT information.

Next, services manager 114 may provide the first packet. For example, services manager 114 may provide the first packet to a virtual Bluetooth device that communicates with electronic device 112-1 via the virtual Bluetooth gateway. This virtual Bluetooth device may have the capabilities of a physical Bluetooth radio. However, services manager 114 may not include the physical Bluetooth radio, such as dedicated hardware for the physical Bluetooth radio.

Moreover, the virtual Bluetooth device may provide a payload or contents of the first packet to an application associated with a service provider that executes in a separate virtual machine or a container in services manager 114 (and, more generally, higher in a software stack in services manager 114).

Similarly, the virtual Bluetooth gateway in services manager 114 may receive a third packet (e.g., from the virtual Bluetooth device) that is compatible with the Bluetooth communication protocol. Then, services manager 114 may encapsulate the third packet in a fourth packet that has the IP-compatible format. Next, services manager 114 may provide the fourth packet to electronic device 112-1 via access point 110-1. For example, the fourth packet may be communicated using the MQTT communication protocol. After receiving the fourth packet, access point 110-1 may de-encapsulate the third packet from the fourth packet, and then may provide the third packet to electronic device 112-1 using the Bluetooth communication protocol.

Note that the virtual Bluetooth gateway may support a set of vendor-independent Bluetooth operations that facilitate communication with a vendor-specific Bluetooth application (which may be executed by electronic device 112-1). For example, the virtual Bluetooth gateway may provide APIs for the set of vendor-independent Bluetooth operations. This capability may facilitate remote discovery of attributes or characteristics associated with electronic device 112-1 using, e.g., the vendor-specific GAP packet or a vendor-specific GATT packet that is communicated in the vendor-independent first packet using the IP-compatible format.

In these ways, these embodiments of the communication techniques may allow services manager 114 and electronic device 112-1 to flexibly communicate with each other. Notably, services manager 114 may not need to perform vendor-specific or custom translation of packets from or to the (vendor-specific) Bluetooth application executing on electronic device 112-1. Moreover, by using the IP-compatible format, services manager 114 may ensure that the second packet can be recovered from the first packet without requiring a customized translation technique. Consequently, the communication techniques may allow applications to be flexibly generated at scale, such as in large deployments, which may improve the user experience and may enable the IoT.

While the communication techniques in FIG. 1 are illustrated using access points 110 and services manager 114, in other embodiments at least some of the access points 110 may be eNodeBs (not shown). Moreover, an eNodeB may communicate with at least one of access points 110, e.g., using an LTE-WLAN aggregation (LWA) communication protocol. Moreover, while operations in the communication techniques in FIG. 1 are illustrated as being performed by services manager 114, in other embodiments at least some of these operations may be performed by another electronic device, such as one of access points 110, controller 124 or one of computers 116.

We now further describe embodiments of access points 110 and services manager 114. Current IoT-device gateways often operate within closed proprietary ecosystems, which can make it difficult to integrate a wide array of management platforms and disparate IoT-device networks. These problems are typically compounded by architectural limitations. For example, the gateways may have monolithic non-modular architectures that often are not scalable and customizable for different IoT-device network deployment scenarios, and these gateways are usually tied to expensive purpose-built hardware.

In order to address these challenges, access points 110 may aggregate and disburse data across disparate IoT devices, and may include data-acquisition and data transformation capabilities (such as a data acquisition and transformation engine or control logic). In addition, services manager 114 may include: a gateway abstraction service, an internal software development kit (SDK) that allows management of a control and management plane, and/or a partner services SDK that allows partner services providers to manage contained resources in services manager 114 that are associated with the respective partner services providers. Note that communication between services manager 114 and access points 110 may use a communication protocol, such as MQTT.

Figure 2:
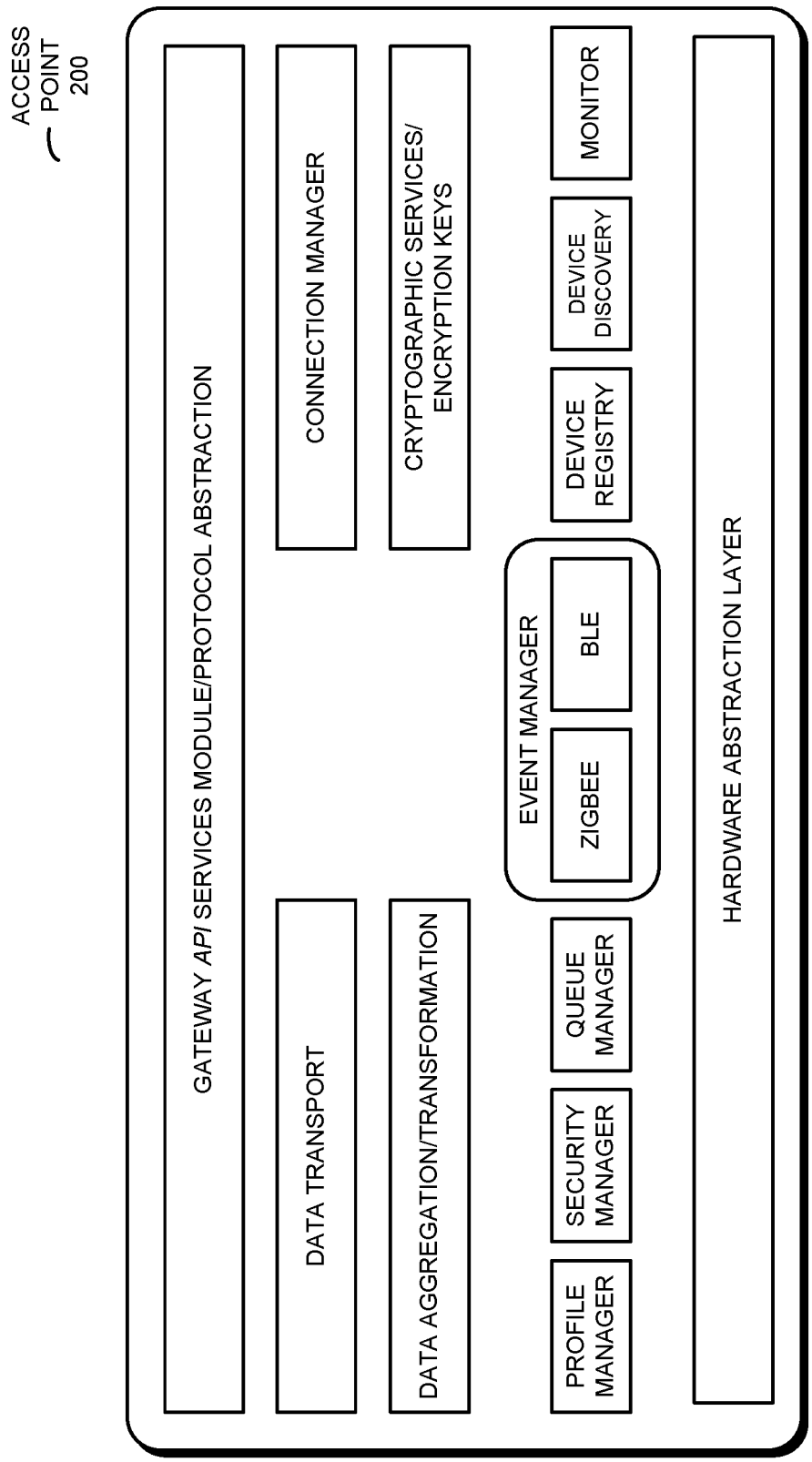
FIG. 2 is a drawing illustrating an example of functionality of an access point in FIG. 1 in accordance with an embodiment of the present disclosure.

FIG. 2 presents a drawing illustrating an example of functionality of an access point 200, such as access point 110-1 in FIG. 1. Access point 200 may include an embedded IoT gateway and may provide an IoT-device management platform that is programmable and that can be easily integrated with existing management solutions. The core gateway functions in access point 200 may include: different communication-protocol stacks, a hardware for communication-protocol abstraction (which can provide a unified view of IoT devices to management platform), data acquisition (such as data aggregation and transformation), prioritization (data/traffic prioritization), management (which can access and set an electronic-device configuration), security (secure electronic-device authentication/actuation and cryptographic services, such as storing one or more encryption keys associated with particular electronic devices), data transport (such as MQTT), a connection manager and/or a gateway API services module and communication-protocol abstraction. In addition, access point 200 may include: an event manager core application (for different communication protocols, such as Zigbee or BLE), a profile manager for the different communication protocols, a security manager, a queue manager, an electronic-device registry, electronic-device discovery and/or a monitor that ensures safe and appropriate operation (such as by detecting an anomaly), and that tracks communication performance, etc.

In some embodiments, access point 200 may include a trusted secure element, WLAN firmware, an IoT gateway engine or control logic (such as one or more physical layer communication protocols) and an application layer that translates between different communication protocols. Note that a given access point may provide at least one communication protocol (in addition to Wi-Fi) via a USB dongle, and groups of access points may be interleaved to provide multiple different communication protocols.

After receiving information (such as IoT-device data or data traffic) from one or more of electronic devices 112 in FIG. 1, access point 200 may translate, into a unified format, the information associated with the one or more electronic devices 112, which may have been received by access point 200, at an interface circuit in access point 200, using different communication protocols. Then, access point 200 may send or communicate the translated information in a unified and consistent manner to a services manager, such as services manager 114 (FIG. 1). For example, access point 200 may provide, from an interface circuit in access point 200, the translated information for one or more additional electronic devices (such as services manager 114 in FIG. 1) using another communication protocol, such as MQTT.

In some embodiments, access point 200 (or services manager 114 in FIG. 1) may provide security by selectively including communication with an electronic device (such as electronic device 112-1 in FIG. 1) in an inclusion list and/or by selectively excluding communication with other electronic devices (such as electronic device 112-2 in FIG. 1) in an exclusion list. For example, the black and/or white lists may be applied by access point 200 following a scan.

Figure 3:
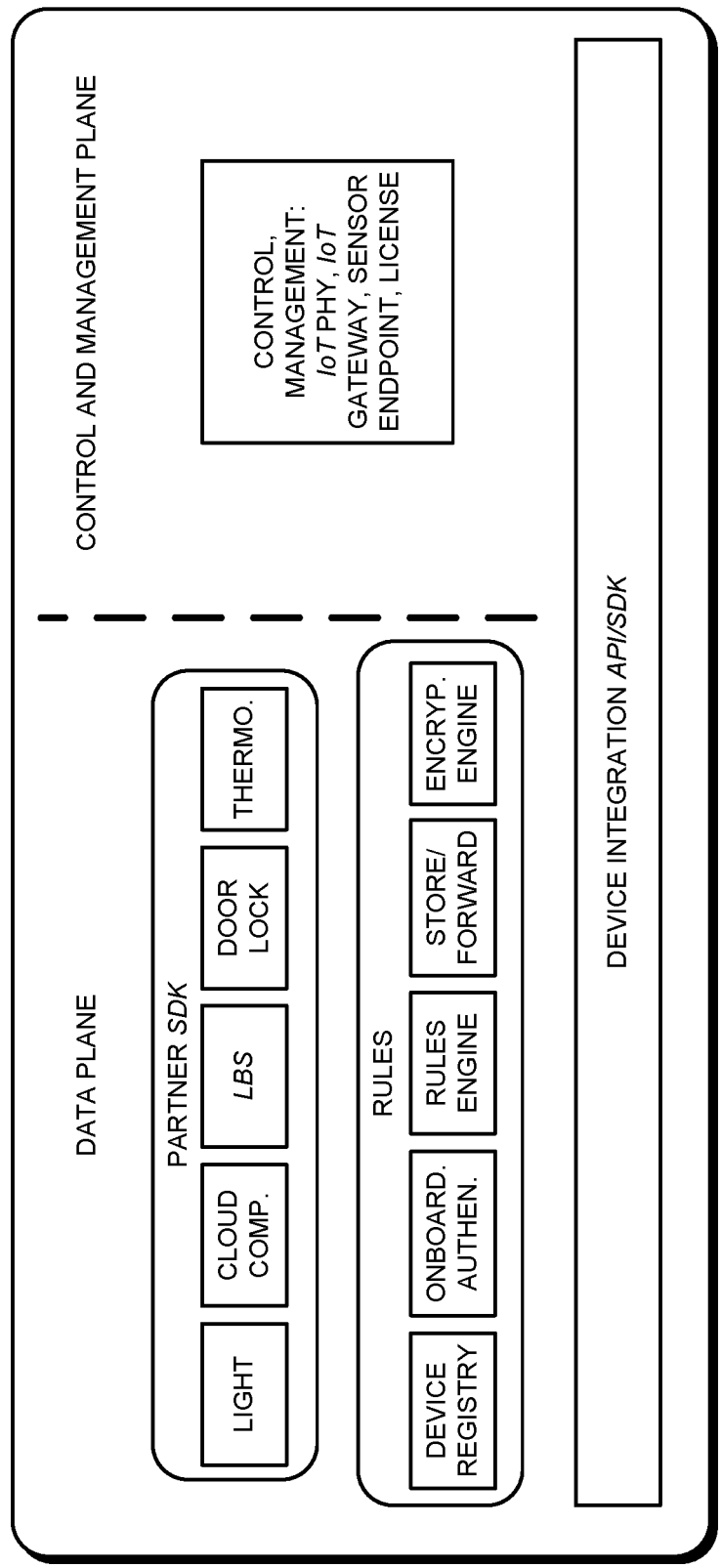
FIG. 3 is a block diagram illustrating an example of an Internet-of-Things (IoT) services manager of FIG. 1 in accordance with an embodiment of the present disclosure.
Figure 4:
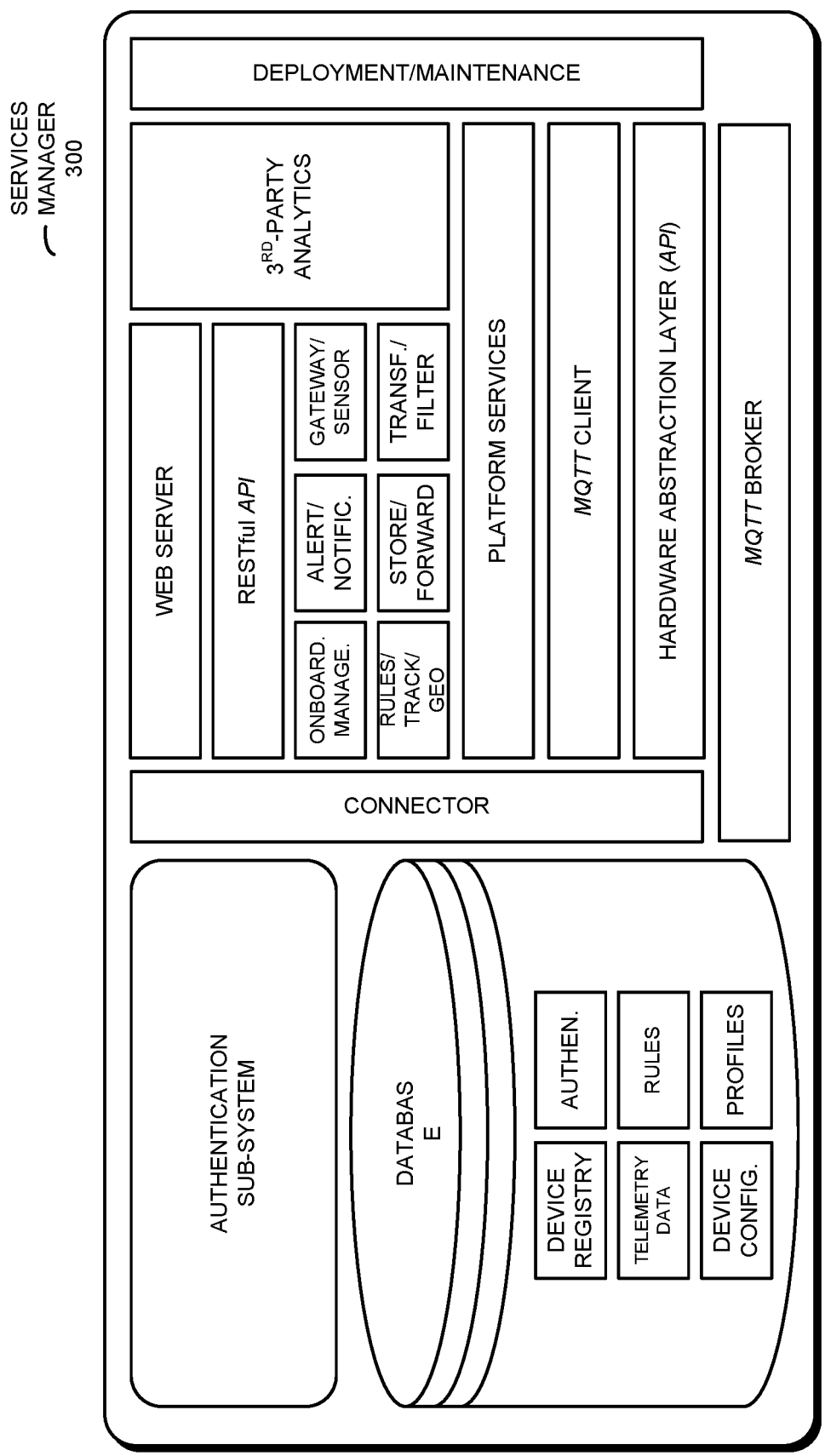
FIG. 4 is a block diagram illustrating an example of a software architecture of the services manager of FIGS. 1 and 3 in accordance with an embodiment of the present disclosure.

FIG. 3 presents a block diagram illustrating an example of a Virtual Internet-of-Things (VIoT) services manager 300, such as services manager 114 in FIG. 1. This services manager may include: a gateway that communicates with one or more access points 110 (FIG. 1) via a communication protocol (such as MQTT); a control and management plane with system-configuration information; and a data plane with a registry of the one or more of electronic devices 112 (FIG. 1), rules for the one or more of electronic devices 112, and APIs for service providers. Services manager 300 may provide a programmable, modular and integrated system for flexibly and securely exchanging data and associated services among access points 110, electronic devices 112, services manager 114 or 300, and computers 116 in FIG. 1. Moreover, resources in services manager 300 that are associated with different service providers may be contained in separate virtual machines. Alternatively or additionally, the resources from different service providers may be included in 'containers,' such as docker containers. Note that a docker container may be a lightweight, stand-alone, executable package of a piece of software that includes everything needed to run it: code, runtime, system tools, system libraries, and settings. The containerized software may run the same, regardless of the environment. Containers also may isolate software from its surroundings, such as differences between development and staging environments, and may help reduce conflicts between different software that is running on the same infrastructure.

As noted previously, services manager 300 may include a control and management plane. The control and management plane may include: control management, an IoT physical layer, a gateway (such as a gateway engine, control logic or module), an IoT-device endpoint, and/or associated licenses. In addition, the control and management plane may provide system-architecture configuration, such as: transmit power, Internet Protocol or IP addresses, etc.

Moreover, services manager 300 may include a data plane with a partner SDK (for applications/services such as: a door lock, a thermostat, a light, analytical services, location-based services or LBS, cloud-based computing, etc.). Furthermore, the data plane may include rules, such as: an electronic-device registry (which may include device-specific information in device profiles), a rules engine or module, onboarding, authentication, an encryption engine or control logic, and store and forward.

Services manager 300 may be a dual-stack, open-programmable, virtualized IoT device-management gateway platform. It may be highly customizable, deployable in multiple network topologies, and may be integrated with existing management networks. The dual-stack, open-programmable, virtualized IoT device-management gateway platform may be an enterprise-grade IoT device-management platform. Note that services manager 300 may be a policy-driven virtualized wireless gateway that manages an IoT device network that includes one or more types of IoT devices from one or more manufacturers, and which may use different communication protocols. The open framework may facilitate IoT-device management in separate virtual machines, which may offer different vertical services.

In some embodiments, access point 200 (FIG. 2) and/or services manager 300 addresses a typical IoT device-network management system, which may include: wireless IoT devices, a physical communication layer, a network connectivity/protocol layer, and/or a gateway layer. Notably, access point 200 (FIG. 2) may include a data acquisition layer. For example, a data acquisition engine or control logic may enable gateway communication at scale with many IoT devices using disparate IoT-device connectivity or communication protocols (such as BLE, Zigbee, Z-Wave, etc.). This data acquisition layer may include the drivers and metadata information used to recognize and communicate with the different IoT-device types using different communication protocols.

Moreover, access point 200 (FIG. 2) may include an aggregation and translation layer. Notably, many of the IoT-device connectivity or communication protocols are rudimentary and fragmented. For example, Zigbee or BLE often does not provide support for IP. The aggregation and translation layer may perform the function of normalizing the data collected across these IoT devices. This block may perform packet processing and encapsulation functions for disparate incoming IoT-device packets and the output of this block may be normalized data in a standard format (such as MQTT) that is recognizable by a programmable application layer.

Furthermore, services manager 300 may include a programmable application layer. Notably, a smart-gateway abstraction service in services manager 300 may provide a full edge analysis engine or module. For example, the programmable application layer may implement blocks and functions, such as: a message broker, a rules engine or module, an onboarding engine or module, an electronic-device registry, a store and forward engine or module, and/or an encryption engine of control logic. Note that this layer may host a runtime environment and/or libraries that enable a third-party IoT SDKs, such as the partner service-provider SDKs. The routing of data packets to different third-parties may be based at least in part on predefined policies specified by a user, such as a customer or a service-provider partner.

Additionally, services manager 300 may include an open management interface layer.

Services manager 300 may be a self-contained virtual machine that includes APIs that enable customers and/or service-provider partners to add another layer of contextualization/customization based at least in part on specific business needs. This flexibility may make services manager 300 highly programmable and rapidly deployable.

Note that services manager 300 may be architected as a dual-stack gateway. A first stack may include the data acquisition layer and the aggregation and translation layer. As discussed previously, the first stack may physically reside in a wireless access point (such as access point 200 in FIG. 2) and/or in on-premise gateway hardware.

A second stack may include the programmable application layer and the open management interface layer. Note that the second stack is a virtual machine that can reside on any of the wireless gateway hardware, such as access point 200 (FIG. 2), controller 124 (FIG. 1), services manager 300. Thus, the second stack may be on-premise, in a data center or may be cloud-based. Therefore, in general functionality of access point 200 (FIG. 2) and/or services manager 300 may be implemented by an arbitrary component, such as a local or a distributed electronic device or system.

The dual-stack architecture may provide flexibility to be deployed in an arbitrary network topology. In addition, this architecture may enable a distributed gateway architecture.

The core functions of the solution (which is sometimes referred to as an 'IoT gateway') implemented in access point 200 (FIG. 2) and services manager 300 may include: centralized management (secure onboarding management of IoT devices and gateways), data aggregation (aggregate and transform data from multiple gateways), edge analytics (process data at the edge, i.e., behind the firewall, from multiple gateways), hardware abstraction (provide unified view/management of different IoT-device types), and/or rules and alerts (create rules and alerts, predictive analysis, etc.).

The technology and capabilities of the solution implemented in access point 200 (FIG. 2) and services manager 300 may include: self-contained container/virtual machine that can be hosted anywhere (such as a controller, a switch, in the cloud, etc.). Moreover, the solution may have multi-tenants, which provides flexible deployment models and allows the use of a public and/or a private cloud. Furthermore, the solution may have the ability to host $3^{rd}$-party SDKs and may provide a unified view of IoT devices/ gateways. Additionally, the solution may incorporate edge computing capabilities (e.g., via a partner SDK and/or internal capability). The solution may be highly modular with a cloud-scale architecture.

In some embodiments, an open, programmable IoT gateway module may be programmed through a multitude of management platforms using one or more interfaces. Moreover, the IoT gateway may be capable of machine learning and intelligent decision making at the edge without back-hauling information to the cloud, e.g., intelligent channel selection and assignment of channels across disparate wireless radios (such as Zigbee, Bluetooth, BLE, Wi-Fi, LoRaWAN, etc.). Furthermore, the IoT gateway may automatically detect anomalies and may dynamically use rules for creation/insertion to suppress anomalies. In addition, the IoT gateway may provide notifications, intelligent tracking and geo fencing of IoT and IoT-device assets. Additionally, the IoT gateway may intelligently identity and classify electronic devices, e.g., learning electronic-device characteristics based at least in part on communication patterns, association patterns, and/or beaconing patterns. These characteristics may be used to assign traffic from an electronic device to a queue with an appropriate queue latency. The IoT gateway may also prioritize electronic devices and/or electronic-device categories based at least in part on the learned characteristics, which may be used to prioritization of messages and/or message categories. In some embodiments, the IoT gateway may guarantee delivery of certain IoT messages, such as based at least in part on prioritization, intelligent classification and/or machine learning FIG. 4 presents a block diagram illustrating an example of a software architecture of services manager 300. Notably, services manager 300 may include: an MQTT broker, a hardware abstraction layer API, an MQTT client, VIoT platform services (such as Java/Python runtime platform services), a gateway/IoT-device onboarding management, alerts/notifications, gateway/IoT-device actions, a rules engine/tracking/geo fencing, store and forward, and/or data transformation and filter. In addition, services manager 300 may include: $3^{rd}$-party edge analytics, a RESTful API (which uses HTTP requests to GET, PUT, POST and DELETE data) for provisioning, actuation, statistics aggregation and management, a web server, an authentication subsystem, and/or a database. The $3^{rd}$-party edge analytics may interface to external analytics services, the Web server may interface to one or more external cloud-based components, partner management portals, dashboard services and/ or mobile applications. Note that the database may include information, such as: an electronic-device registry, telemetry data, electronic-device configuration, authentication, rules and/or profiles (e.g., electronic-device characteristics or device-specific information). In some embodiments, services manager 300 supports blockchain for highly secure environments.

Figure 5:
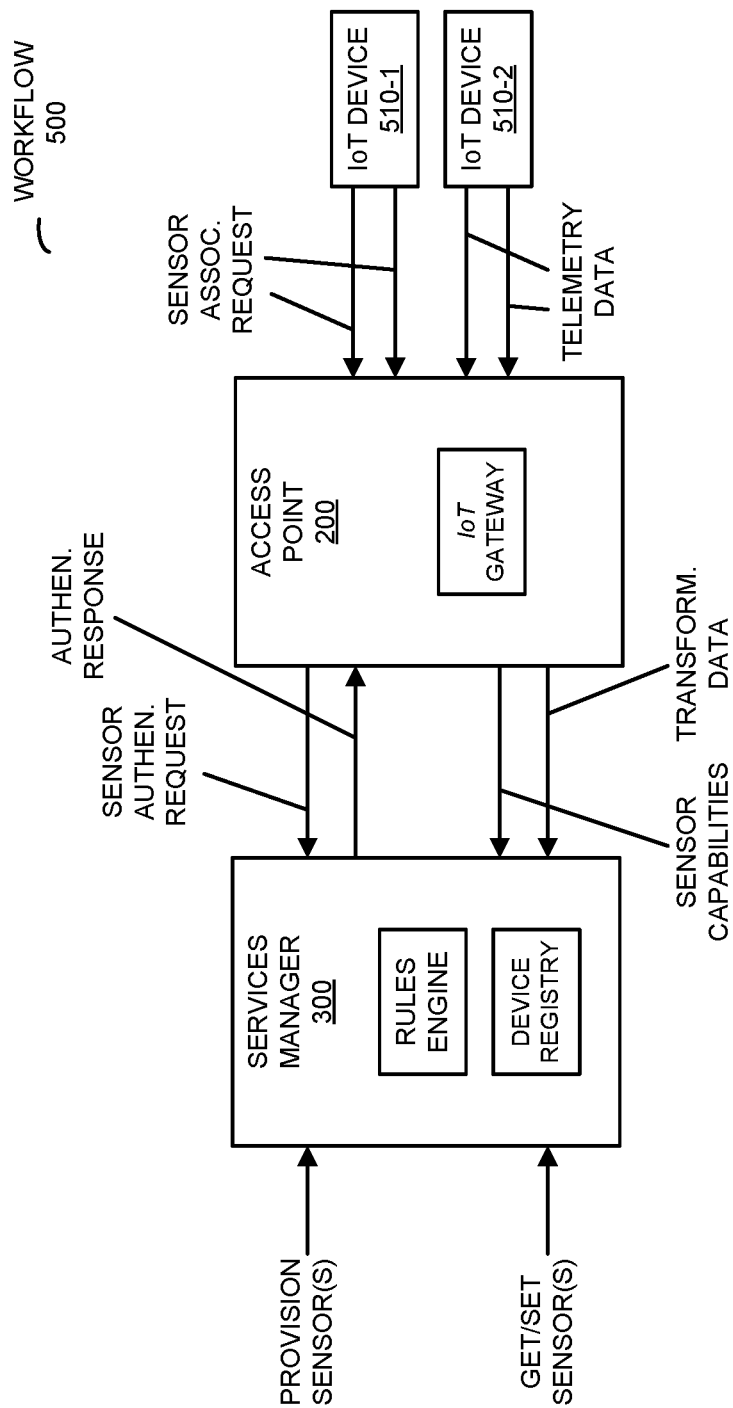
FIG. 5 is a drawing illustrating an example of an onboarding work flow in accordance with an embodiment of the present disclosure.

FIG. 5 presents a drawing illustrating an example of an onboarding work flow 500. Notably, IoT devices may be provisioned via an API call. Then, services manager 300 may create entry in an electronic-device registry. Moreover, one or more of IoT devices 510 may provide an IoT-device associate request to a gateway in access point 200. In response, access point 200 may provide an IoT-device authorization request to services manager 300, and may receive an authorization response. Next, access point 200 may provide information about IoT-device capabilities (and, more generally, characteristics of IoT devices 510). Furthermore, services manager 300 may receive an API call to get or set IoT devices, which may be forwarded to one or more of IoT devices 510. In response, one or more of IoT devices 510 (such as IoT device 510-2) may provide telemetry data. Associated transformed data may be provided by access point 200 to services manager 300. Additionally, services manager 300 may process the transformed data and/or may trigger local rules.

Figure 6:
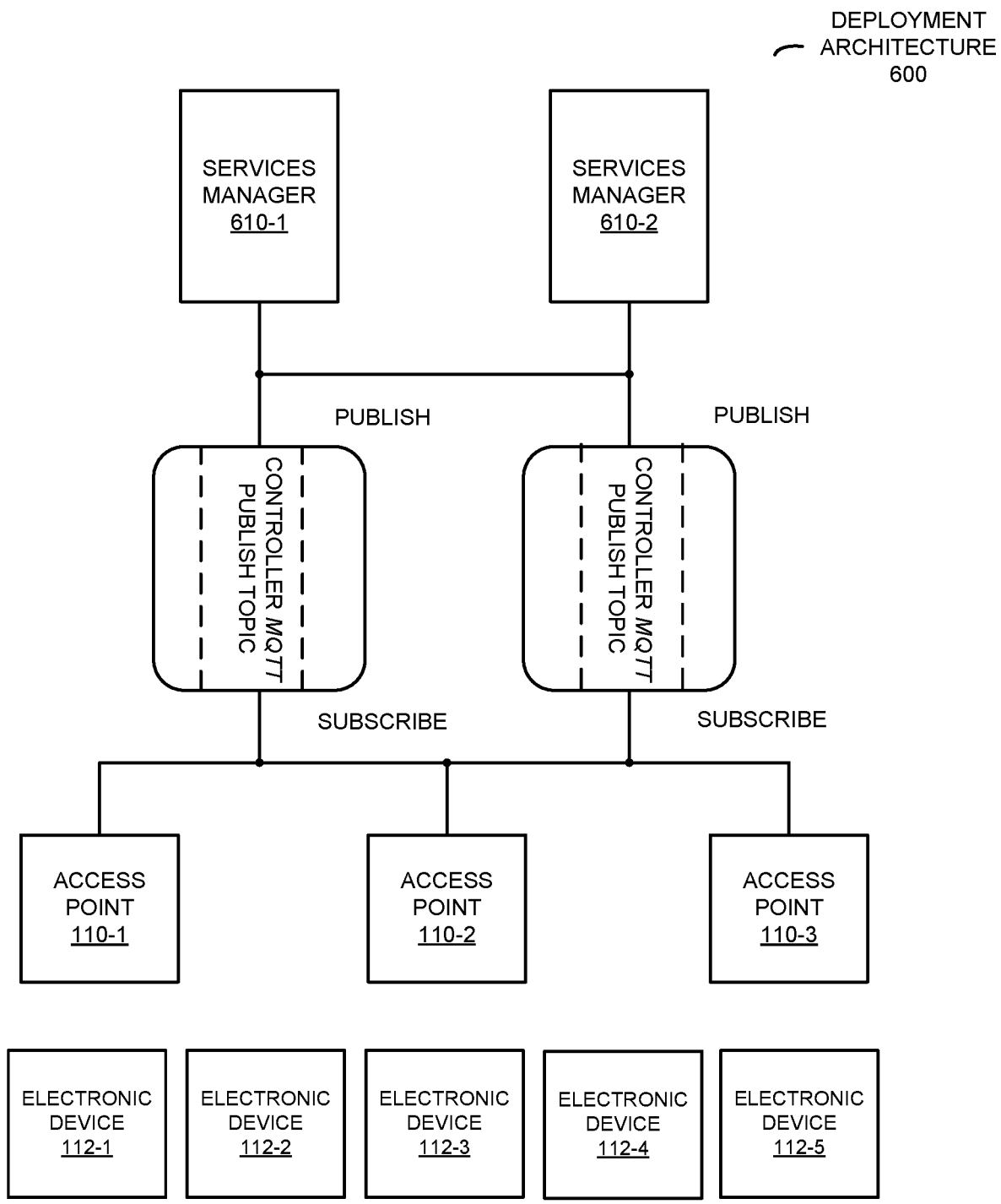
FIG. 6 is a drawing illustrating an example of a deployment architecture in accordance with an embodiment of the present disclosure.

FIG. 6 presents a drawing illustrating an example of a deployment architecture 600. This architecture may include: one or more IoT devices or electronic devices 112 (which may include one or more sensors or sensing capabilities), one or more access points 110 (or gateways), and one or more services managers 610. Services managers 610 may publish or subscribe messages via controller MQTT publish topics. For example, services managers 610 may publish or subscribe messages using channels (which may be static or dynamic) having associated priorities.

Note that a given services manager (such as services manager 610-1) may dynamically configure subdomains in access points 110 and/or electronic devices 112 (FIG. 1) to define a range of communication using a communication protocol, such as MQTT. Alternatively or additionally, the given services manager may dynamically define channels for data traffic with access points 110 and/or electronic devices 112, where the channels are associated with different topics.

While the preceding embodiments illustrate access points 110 and services manager 114 as having particular components and a particular architecture, other embodiments may include fewer or more components, different components and/or a different architecture.

We now describe embodiments of methods associated with the communication techniques. FIG. 7 presents a flow diagram illustrating an example of a method 700 for dynamically generating an application, which may be performed by an electronic device, such as services manager 114 or one of computers 116 in FIG. 1. During operation, the electronic device may access information (operation 710)

that specifies communication associated with a second electronic device, an access point and a gateway. For example, accessing the information may involve: receiving, at an interface circuit, the information; or determining the information by monitoring the communication.

Then, the electronic device may analyze the information to determine data patterns (operation 712) associated with the communication. Note that the data patterns may include communication operations and data-transformation operations performed by one or more of the second electronic device, the access point or the gateway. In some embodiments, the data patterns may specify an order, an interrelationship or both of the predefined component blocks or modules. Moreover, the data patterns may include configurations of one or more of the second electronic device, the access point or the gateway.

Next, the electronic device may dynamically generate an application (operation 714) using predefined component blocks or modules (e.g., one or more sets of program instructions) based at least in part on the determined data patterns and metadata associated with the predefined component blocks or modules. In some embodiments, the application may include bidirectional communication among two or more of the second electronic device, the access point and the gateway. Alternatively or additionally, the application may include multiple threads or processes, where a given thread is associated with a subset of the predefined component blocks or modules based at least in part on resource limitations of the second electronic device, the access point and/or the gateway. Note that, for a given predefined component block or module, the metadata may specify one or more internal functions and one or more interconnections to one or more other components.

In some embodiments, the electronic device may optionally perform one or more additional operations (operation 716). For example, the electronic device may provide, from the interface circuit, the application addressed to the access point or the gateway.

Moreover, the application may be dynamically generated based at least in part on parameters associated with a service. For example, the parameters may be associated with a service level agreement, such as a specified communication performance.

Furthermore, dynamically generating the application may involve: providing, from the interface circuit, a user interface that specifies the predefined component blocks or modules and the data patterns; and receiving, at the interface circuit, user-interface activity that specifies selections from the predefined component blocks or modules and the data patterns, where the application may be dynamically generated based at least in part on the specified selections.

In some embodiments of method 700 there may be additional or fewer operations. Furthermore, the order of the operations may be changed, and/or two or more operations may be combined into a single operation.

Figure 8:
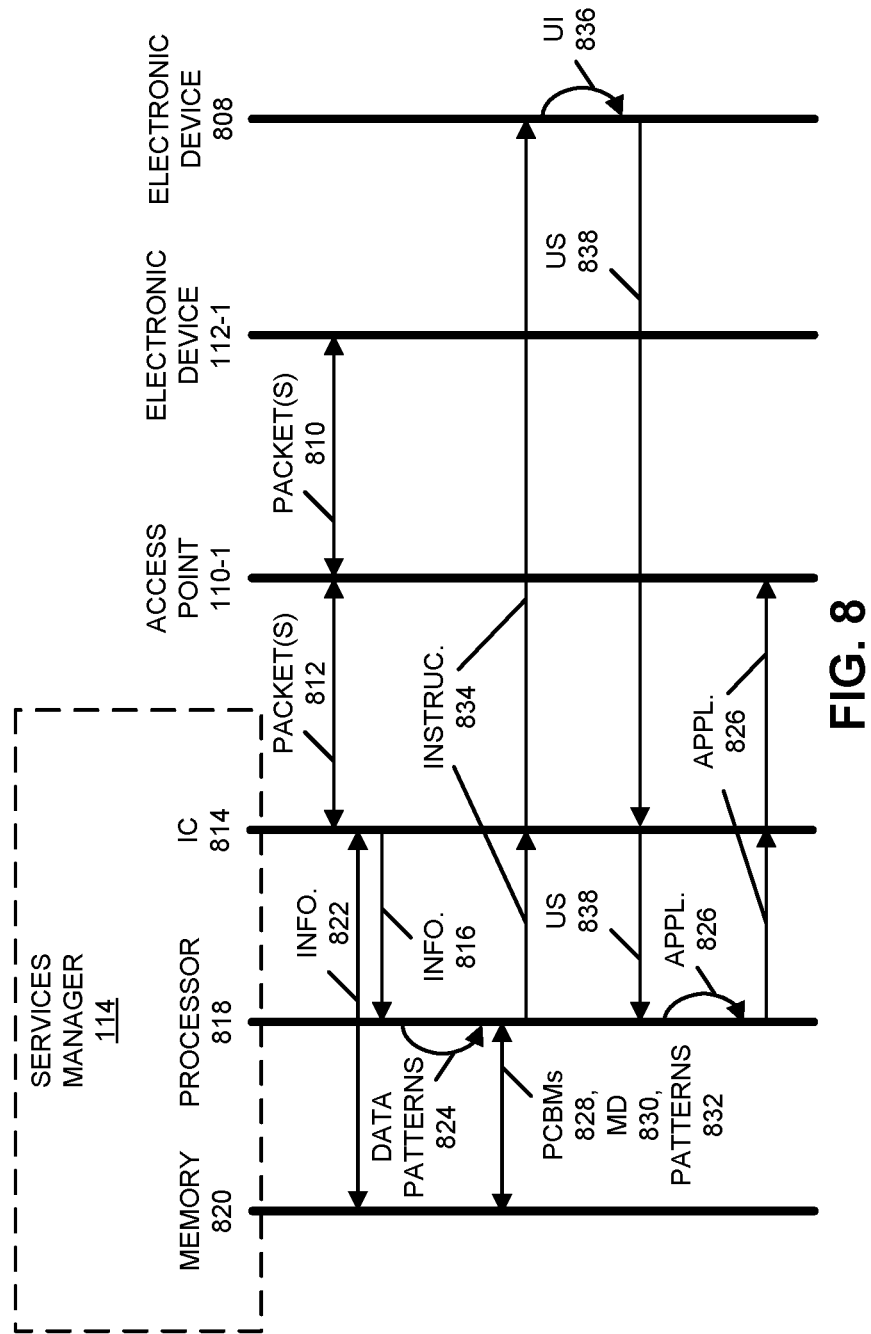
FIG. 8 is a drawing illustrating an example of communication among the electronic devices in FIG. 1 in accordance with an embodiment of the present disclosure.

Embodiments of the communication techniques are further illustrated in FIG. 8, which presents a drawing illustrating an example of communication among electronic device 112-1, access point 110-1, services manager 114 and electronic device 808. Notably, electronic device 112-1 may communicate one or more packets 810 or frames with access point 110-1. Access point 110-1 may perform one or more data-transformation operations on information included in the one or more packets 810 or frames (such as changing an encoding or reformatting data for an application programming interface in a gateway in services manager 114).

Moreover, access point 110-1 may communicate one or more packets 812 or frames with the gateway in services manager 114.

Interface circuit 814 in services manager 114 may monitor this communication (directly and/or indirectly, such as based at least in part on information about the communication provided by electronic device 112-1 and/or access point 110-1). Then, interface circuit 814 may provide information 816 about the communication to a processor 818 in services manager 114. Alternatively or additionally, processor 818 may access stored information 822 about the communication in memory 820 in services manager 114 prior to providing information 816.

Next, processor 818 may analyze information 816 and/or 822 to determine data patterns 824 associated with the communication. Moreover, processor 818 may dynamically generate an application 826 based at least in part on predefined component blocks or modules (PCBM) 828, data patterns 824, metadata (MD) 830 associated with the predefined component blocks or modules 828 and/or parameters 832 associated with a service and/or a service level agreement. Note that information about predefined component blocks or modules 828, metadata 830 and/or parameters 832 may be stored in memory 820 and may be accessed by processor 818.

In some embodiments, processor 818 dynamically generates application 826 by providing instructions 834 for a user interface (UI) 836 to interface circuit 814, which provides instructions 834 to electronic device 808, which may be associated with a user. Electronic device 808 may display user interface 836 based at least in part on instructions 834. Note that user interface 836 may include selectable user-interface objects associated with user-interface objects corresponding to predefined component blocks or modules 828 and information about (such as specifying or corresponding to) predetermined or predefined data patterns 824. Then, electronic device 808 may receive user-interface activity that specifies user selections (US) 838 in user interface 836. Moreover, electronic device 808 may provide user selections 838 to services manager 114. After receiving user selections 838, interface circuit 836 may provide user selections 838 to processor 818, which uses user selections 838 to dynamically generate application 826.

Furthermore, after dynamically generating application 826, processor 818 may provide, via interface circuit 814, application 826 to access point 110-1. Alternatively or additionally, processor 818 may execute application 826 and/or provide application 826 to a gateway in services manager 114, which may execute application 826.

Note that application 826 may integrate component blocks or modules associated with existing operations (such as communication and/or data-transformation operations) performed by access point 110-1 and/or services manager 114. Alternatively or additionally, application 826 may use data patterns 824 associated with the existing operations performed by access point 110-1 and/or services manager 114 to dynamically generate application 826 in order to specify new operations (such as communication and/or data-transformation operations) to be performed by access point 110-1 and/or services manager 114. For example, application 826 may leverage knowledge (at least in part in the form of data patterns 824) associated with an existing solution to dynamically generate a new instance of an integrated solution, such as an instance of the existing solution for use in a different operating environment (such as a different operating system), different system resources, with a different IoT device, and/or for a different use case.

While FIG. 8 illustrates communication between components using unidirectional or bidirectional communication with lines having single arrows or double arrows, in general the communication in a given operation in this figure may involve unidirectional or bidirectional communication.

As noted previously, while in some embodiments the electronic device dynamically generates the application in an automated manner (e.g., without user input or operations), in other embodiments the application is dynamically generated based at least in part on user selections. For example, the electronic device may provide instructions or information that specifies a user interface. This user interface may include selectable user-interface objects associated with predefined component blocks or modules and information specifying or corresponding to predetermined or predefined data patterns associated with communication associated with a second electronic device, an access point and a gateway. The user interface may be displayed on a display associated with a local electronic device (such as a computer associated with a user). In response, the user may user a user-interface device (such as a keyboard, a mouse, a touch pad, a track pad, a touch-sensitive display, a gesture monitoring device, a voice recognition interface, etc.) to provide the selections. A user-interface controller in the local electronic device may receive user-interface activity information that specifies selections of at least a subset of the predefined component blocks or modules, and the local electronic device may provide information specifying the user-interface activity to the electronic device, which then uses this information to dynamically generate the application.

Figure 9:
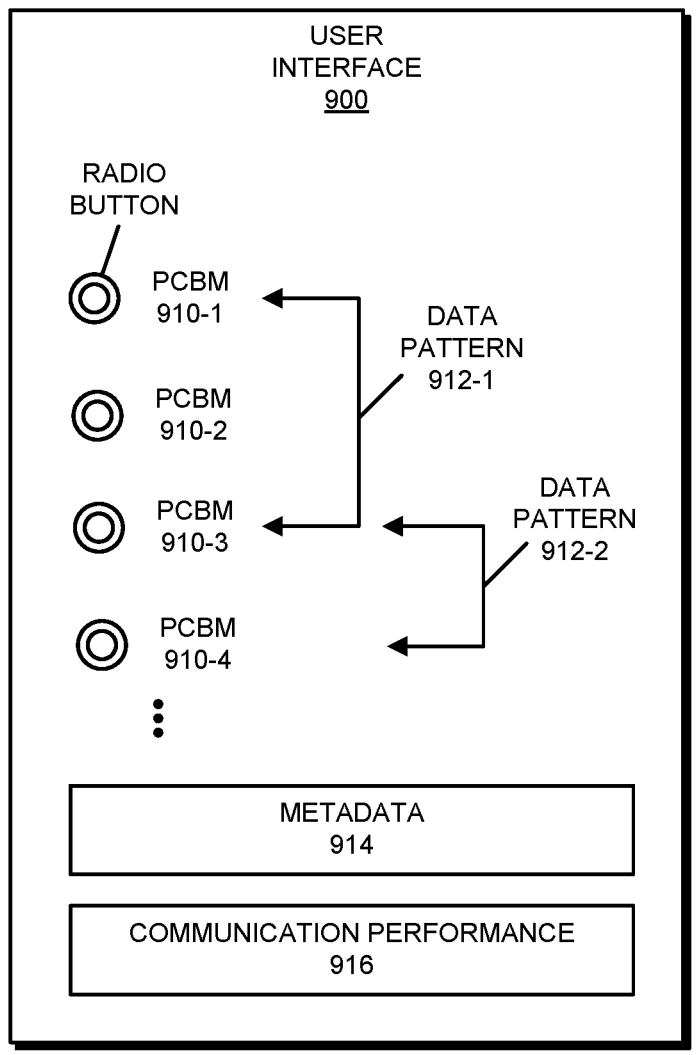
FIG. 9 is a drawing illustrating an example of a user interface that facilitates dynamic generation of an application in accordance with an embodiment of the present disclosure.

FIG. 9 presents a drawing illustrating an example of a user interface 900 that facilitates dynamic generation of an application. This user interface may include: selectable user-interface objects associated with predefined component blocks or modules 910 (such as one or more sets of program instructions that perform one or more corresponding functions) and information specifying or corresponding to predetermined or predefined data patterns 912 associated with communication associated with a second electronic device, an access point and a gateway. For example, the selectable user-interface objects associated with predefined component blocks or modules 910 may include one or more user-interface objects, such as: a radio button, a checkbox, a switch, a drop-down menu, a text-entry box, another type of selection control, etc.

Moreover, the predetermined or predefined data patterns 912 may include an order and/or an interrelationship of the predefined component blocks or modules 910. For example, the predetermined or predefined data patterns 912 may include communication operations and data-transformation operations performed by one or more of the second electronic device, the access point or the gateway. Additionally, the data patterns may include configurations of one or more of the second electronic device, the access point or the gateway. Note that the predefined component blocks or modules 910 may be based at least in part on the predetermined or predefined data patterns 912. Thus, user interface 900 may include the predefined component blocks or modules 910 that are likely to be of interest to the user and, therefore, that are likely to be selected and included in the application.

Furthermore, user interface 900 may include metadata 914 associated with the predefined component blocks or modules 910. For example, for a given predefined component block or module, metadata 914 may specify one or more internal functions and one or more interconnections to one or more other components. Thus, metadata 914 may indicate how the predefined component blocks or modules 910 work and how they can be interconnected to the one or more other components.

Additionally, user interface 900 may specify communication performance 916 associated with the selections, e.g., based at least in part on a service level agreement. For example, user interface 900 may specify a current communication performance associated with the current user selections relative to a desired communication performance (such as throughput, a capacity, a number of supported clients, a latency, etc.) associated with a service and/or a service level agreement.

In some embodiments, the selections may specify: bidirectional communication among two or more of the second electronic device, the access point and the gateway; and/or multiple threads or processes, where a given thread is associated with a subset of the predefined component blocks or modules based at least in part on resource limitations of the second electronic device, the access point and/or the gateway. For example, in the application, messages may be distributed to particular processes or threads based at least in part on message queue priorities.

While user interface 900 is illustrated with particular information and user-selection controls, in other embodiments user interface 900 may include: fewer or additional user-interface objects, different user-interface objects, two or more user-interface objects may be combined into a single user-interface object, a single user-interface object may be separated into two or more separate user-interface objects, and/or locations of one or more user-interface objects may be changed.

In some embodiments, the communication techniques provide a data-driven solution for generating a vendor-specific application, instead of a tailor-made solution. Notably, by analyzing data patterns, preexisting or predefined component blocks or modules may be integrated to dynamically generate an application or a solution that provides desired functionality.

For example, packets or frames (and, more generally, traffic) associated with a panic button may have or may be compatible with a JSON format. An access point or a gateway (or controller) may reformat (and, more generally, may perform a data-transformation operation on) the packets or frames so that they are compatible with an API associated with the panic button. Alternatively, a message from an IoT device may be encoded using base 64, and the access point or the gateway may restructure or re-encode the message.

These operations (and, more generally, data patterns) may be determined by analyzing the communication among the panic button or IoT device (and, more generally, the second electronic device), the access point and/or the gateway (or services manager). Then, using a matrix of predefined component blocks or modules, metadata about the predefined component blocks or modules, data patterns (such as a communication speed of a serial link to a radio, a queue length, etc.), and/or parameters associated with a service or a service layer agreement (such as a real-time schedule, a quality of service, a throughput, a latency, a number of clients or IoT devices, etc.), a variety of integrated applications may be dynamically generated. Thus, in the communication techniques a system may be rearchitected into building blocks that can be ordered and/or interrelated and assembled into an application based at least in part on predefined component blocks or modules and data-driven assembly information.

In some embodiments, an application may be automatically generated. However, in other embodiments, an application may be generated based at least in part on user selections in a user interface of predefined component blocks or modules.

In some embodiments, the communication techniques address the problem of fast adaptation (in terms of go-to-market, engineering, configuration, and build-up into solutions) of a set of BLE-based service modules (which are sometimes referred to as 'component blocks' or 'modules'), with potentially multiple instances and multiple vendor-device sets, service endpoints and/or deployment models. Notably, it is often difficult, expensive and costly to adapt a multi-service, multi-vendor, multi-application platform using simultaneous BLE services based at least in part on multiple instances of an arbitrary combination of connectionless and connected BLE communications, sending/receiving applications and/or multi-vendor end-device-related services. Note that any combination of these or other parameters may define a service. Moreover, the software for developing, deploying, maintaining, enabling/disabling, and configuring a set of BLE-based service modules may be costly in terms of engineering, deployment, configuration, and maintenance. Furthermore, configuring an arbitrary application or service combination with overlapping functionalities may be unfeasible with discrete plugins or modules, each of which was built for a separate use case.

In the communication techniques, a data-driven adaptive multi-instance, multi-purpose dynamically configured BLE service adaptor-component may simultaneously and dynamically provide a complex set of services defined by a matrix of properties of predefined component blocks or modules, possibly with overlapping dimensions. Note that components of such a service-set matrix may include the dimensions (or metadata) of: a BLE-device vendor, model, and a use-case component identifying fingerprint, e.g., a vendor x iBeacon device accelerometer with a universal unique identifier (UUID) mask y; service communication characteristics, such as a direction of messages (e.g., this service component may be a scanner, connected transmitter, beacon-transmitter, etc.), a type of connectivity (connected, connectionless, hybrid, etc.), and/or a type of service-element use (such as a GATT profile, a GAP profile, an opaque element field, etc.); a type of processing element, such as pass-through, responder, a message-modifying translator, an aggregator, filter, a message multiplicator, a real-time-communicator, a store-and-forward communicator, and/or another type of communication modifier); and/or a type of integrator (such as a vendor device to a vendor back-end connector, a multi-connector across vendors, a rule-driven multi-connector, etc.).

Moreover, in the communication techniques, a configuration engine may allow a dynamic adaptive multi-instance set of services to be configured, set to operation, managed, and/or deactivated as simultaneous elements of the matrix, which may be defined as an instance matrix with values for each dimension or multiple values for one or more dimensions. In practice, the configuration engine may enable an on-the-fly configuration of a BLE plugin or application, such that its properties can be mapped to the domain values of a multi-dimensional matrix and the configuration engine may implement the values as defined by this configuration data.

The communication techniques may provide or facilitate a fast definition and deployment cycle (with cost saving in development, testing, and deployment to use), compared to the current approach of a statically configured and developed per-vendor, per-purpose plugins or applications. Moreover, the communication techniques may also allow for overlap configurations that are typically difficult or unfeasible to implement as static configurations with separate purpose-built applications. Furthermore, the communication techniques may allow dynamic data-driven changes and/or experimental modes that may not be feasible in statically and discretely configured plugin sets or applications.

In some embodiments, a plugin or an application may listen to a set of vendor x beacons from BLE beacon devices with a UUID mask y, and may provide auxiliary beacons for wayfinding. The matrix with metadata for this service in the configuration engine may include: vendor: x, model: tray-beacon, UUID mask: y; message direction: beacon scanner (receiver) and beacon transmitter; message processing: pass-through, aggregator, filter, multiplexer-to-multiple service endpoint instances; and/or multiplexing: a vendor device to a vendor back-end pass-through.

The configuration engine may build a service from a highly parameterized set of dimensions (which may include predefined component blocks or modules). The communication techniques may address the problem of a BLE service-entity configuration in a IoT control-edge computing engine. These approaches are different from existing approaches in which a pluggable service infrastructure uses software elements or applications to provide a set of diverse IoT service and device-vendor use cases as discretely developed (tailor-made) solutions. In contrast, the communication techniques may allow the open, vendor-agnostic infrastructure and architecture of the services manager, with pluggable, programmable, and integrated applications to be dynamically adapted to a wide variety of use cases based at least in part on determined data patterns. These capabilities may provide a rapid deployment of service instances (such as instances of an application) with enterprise-quality integration.

Note that IoT deployments are major topics today across a variety of industries, including: consumer, industrial, enterprises and smart cites. With millions of devices to deploy, configure and manage, providing visibility and statistics at scale is often complicated and typically requires state-of-art networking and management systems.

Traditionally, applications that use communication protocols such as Zigbee and BLE are usually designed for smaller scale with a limited number of electronic device devices and with a gateway or a management device. Applications developed for Zigbee and BLE often attach to a Zigbee or BLE physical radio or an adapter of a gateway. This approach may be suitable for consumer and mobile application development with a limited number of electronic devices to manage and provide statistics. However, with the advent of the IoT and, in particular, in large-scale deployments, the traditional approach often does not serve the needs and scale of deployments in the areas of: electronic-device discovery; onboarding of electronic devices; radio-resource management; management of electronic-device attributes; and/or security.

In the communications techniques, the services manager may address these problems using a deployment architecture coupled with a networking concept of a virtual adapter and a unique set of virtual APIs and virtual attributes to enable IoT deployments at scale and with easier management. Notably, the services manager may include: a distributed software development kit (which may include a set of APIs, e.g., device scanning, device enumeration, device security and/or device provisioning, for manipulating a virtual adapter, virtual GATT profiles and attributes, one or more virtual electronic devices that wrap stack APIs for bulk management of electronic devices and fetching attributes); a virtual adapter (which may be an abstract object to which multiple physical adapters can be subscribed for easier management); a virtual GATT enumeration table (which may be an abstract object that enumerates electronic devices of the same class and provides a unified set of techniques for electronic-device management); virtual GATT attributes (which may be an abstract object that represents electronic-device attributes of the same class and that provides virtual identifiers); one or more virtual electronic devices (each of which may be an abstract class that provides techniques for managing virtual GATT attributes); and/or a physical adapter (which may be a real-world network radio and media access control (MAC) layer having a real-world UUID. Note that the virtual GATT enumeration table and/or the virtual GATT attributes may be provided by a virtual GATT server. Moreover, note that the services manager may include a virtual cluster server (such as for BLE, Zigbee, etc.).

In these ways, the communication techniques may allow applications to be generated on the fly based at least in part on dynamically changing communication conditions and/or the operations performed by the second electronic device, the access point and/or the gateway. These capabilities may allow applications to be flexibly generated in a reliable and a scalable manner, which may enable large-scale deployments. Consequently, the communication techniques may improve the user experience and may enable the IoT.

In some embodiments, the communication techniques may allow a provider of an IoT device to rapidly and efficiently integrate instances of the IoT device with gateways via the services manager. For example, the IoT device may include a BLE vital-sign monitor. Using a user interface (which may be provided by the services manager or another electronic device), a user may dynamically generate an application associated with the BLE vital-sign monitor.

Notably, a user may provide information that specifies the BLE vital-sign monitor (such as by providing information specifying one or more attributes associated with the BLE vital-sign monitor and/or by selecting one or more predefined attributes that are associated with the BLE vital-sign monitor, which may specify a type of the BLE vital-sign monitor, and which are sometimes referred to as 'metadata'), and then may activate a 'scan' icon (and, more generally, a user-interface object) in the user interface. In response, a virtual adapter in the services manager (or IoT controller) may propagate the scan instruction to multiple gateways (such as access points). These gateways may perform scans in one or more bands of frequencies for instances of the BLE vital-sign monitor and/or other electronic devices.

When the scans are completed, the gateways may report back any discovered electronic devices, such as instances of the BLE vital-sign monitor and/or the other electronic devices. Next, the user may activate a 'filter out' icon in the user interface. In response, the services manager may discard the other electronic devices that were discovered, so that the discovered instances of the BLE vital-sign monitor remain.

Moreover, the user may activate a 'connect' icon in the user interface. In response, the virtual adapter in the services manager may instruct that gateways that discovered instances of the BLE vital-sign monitor to establish connections with the instances of the BLE vital-sign monitor.

Furthermore, the user may activate a 'pairing' icon in the user interface. In response, the services manager may select predefined pairing keys (such as SSH keys) and/or may generate pairing keys for the instances of the BLE vital-sign monitor. Then, the virtual adapter in the services manager may provide the pairing keys to the gateways, which provide the pairing keys to the instances of the BLE vital-sign monitor via the connections. Note that a given pairing key may allow an instance of the BLE vital-sign monitor to establish an authenticated and secure connection with the services manager.

Additionally, the user may activate a 'read data' icon in the user interface. In response, the virtual adapter in the services manager may instruct one or more the gateways with one or more secure connections with one or more instances of the BLE vital-sign monitor to import data (such as blood-pressure and/or heart-rate measurements). When the measurements are imported, they may be displayed in the user interface.

The services manager may then store these selected operations and the associated information (such as the attributes of the BLE vital-sign monitor) as a configuration. This configuration may be associated with an API between the services manager and the gateways for the BLE vital-sign monitor. Moreover, this API may enable automated execution of the selected operations as the application for the BLE vital-sign monitor. For example, when a user subsequently activates the 'read data' icon in the user interface, the application may be invoked and the API, and one or more engines, modules or sets of program instructions in the API may perform operations including: scan, filter out, connect, pairing and read data.

In these ways, the application may be dynamically generated. This application may eliminate the need for healthcare providers to manually collect vital-sign measurements from instances of the BLE vital-sign monitor.

In the preceding example, note that the icons in the user interface may be associated with or specify predefined component blocks or modules and information specifying or corresponding to predetermined or predefined data patterns associated with communication associated with the gateways and/or the BLE vital-sign monitor, such as performing a scan, connecting, pairing and/or reading data. Moreover, the user selections of the icons may specify or define the predetermined or predefined data patterns.

Figure 10:
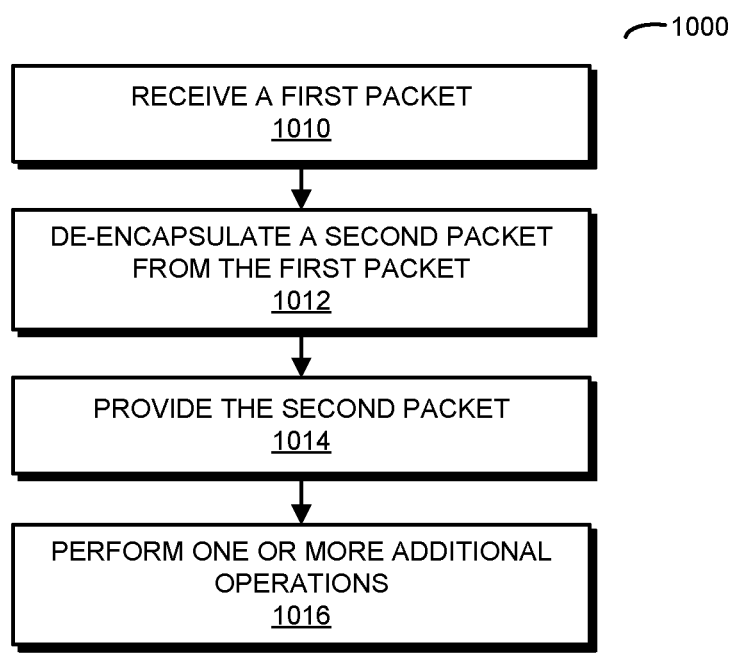
FIG. 10 is a flow diagram illustrating an example of a method for providing a virtual Bluetooth gateway in accordance with an embodiment of the present disclosure.

FIG. 10 presents a flow diagram illustrating an example of a method for providing a virtual Bluetooth gateway, which may be performed by an electronic device, such as services manager 114, one of access points 110 or one of computers 116 in FIG. 1. During operation, the electronic device may receive a first packet (operation 1010) associated with a second electronic device and that has an IP-compatible format, such as a JSON format. Note that the first packet may be communicated with a MQTT communication protocol.

Then, the electronic device may de-encapsulate a second packet from the first packet (operation 1012), where the second packet is compatible with a Bluetooth communication protocol, such as BLE. For example, the second packet may be associated with a Bluetooth application, such as a Bluetooth application that executes on the second electronic device. In some embodiments, the second packet may include a GAP packet or a GATT packet, such as a vendor-specific GAP packet or a vendor-specific GATT packet associated with the Bluetooth application, which, respectively, may include GAP or GATT information.

Next, the electronic device may provide the second packet (operation 1014). For example, the electronic device may provide the second packet to a virtual Bluetooth device that communicates with the second electronic device via the virtual Bluetooth gateway. This virtual Bluetooth device may have the capabilities of a physical Bluetooth radio.

However, the electronic device may not include the physical Bluetooth radio, such as dedicated hardware for the physical Bluetooth radio.

Furthermore, the virtual Bluetooth device (and, more generally, the electronic device) may provide a payload or contents of the second packet to an application associated with a service provider that executes in a separate virtual machine or a container in the electronic device (and, more generally, higher in a software stack in the electronic device). However, in some embodiments, the payload or the contents of the second packet is provided to another electronic device or computer that executes the application associated with the service provider.

In some embodiments, the electronic device performs one or more additional operations (operation 1016). For example, the virtual Bluetooth gateway in the electronic device may receive a third packet (e.g., from the virtual Bluetooth device) that is compatible with the Bluetooth communication protocol. Then, the electronic device may encapsulate the third packet in a fourth packet that has the IP-compatible format. Next, the electronic device may provide the fourth packet addressed to the second electronic device. For example, the fourth packet may be communicated using the MQTT communication protocol.

Additionally, the virtual Bluetooth gateway may support a set of vendor-independent Bluetooth operations that facilitate communication with a vendor-specific Bluetooth application (which may be executed by the second electronic device). For example, the virtual Bluetooth gateway may provide APIs for the set of vendor-independent Bluetooth operations. This capability may facilitate remote discovery of attributes or characteristics associated with the second electronic device using, e.g., the vendor-specific GAP packet or a vendor-specific GATT packet that is communicated in the vendor-independent first packet using the IP-compatible format.

In some embodiments of method 1000 there may be additional or fewer operations. Furthermore, the order of the operations may be changed, and/or two or more operations may be combined into a single operation.

Figure 11:
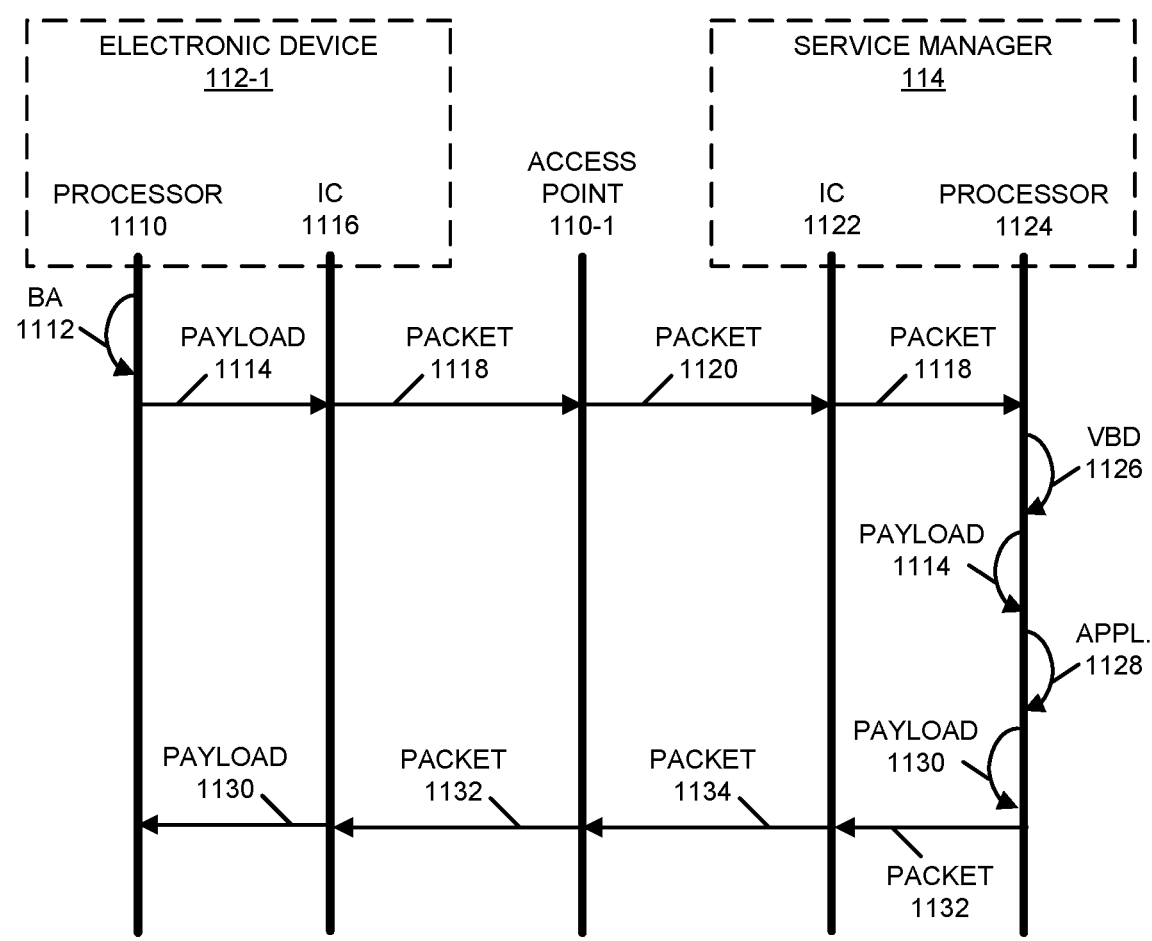
FIG. 11 is a drawing illustrating an example of communication among the electronic devices in FIG. 1 in accordance with an embodiment of the present disclosure.

Embodiments of the communication techniques are further illustrated in FIG. 11, which presents a drawing illustrating an example of communication among electronic device 112-1, access point 110-1, services manager 114. Notably, processor 1110 in electronic device 112-1 may execute a Bluetooth application (BA) 1112. Bluetooth application 1112 may provide a payload 1114 to interface circuit 1116 (such as a physical Bluetooth radio) in electronic device 112-1 along with an instruction to provide a packet 1118 that includes payload 1114 (such as a GAP packet or a GATT packet associated with Bluetooth application 1112) to access point 110-1. This packet may be compatible with a Bluetooth communication protocol, and interface circuit 1116 may communicate packet 1118 using the Bluetooth communication protocol.

After receiving packet 1118, an instance of a virtual Bluetooth gateway in access point 110-1 may encapsulate packet 1118 in a packet 1120 that has an IP-compatible format, such as a JSON format. Then, access point 110-1 may provide packet 1120 to services manager 114. For example, packet 1120 may be communicated using a MQTT communication protocol.

Moreover, services manager 114 may implement another instance of the virtual Bluetooth gateway. An interface circuit 1122 in services manager 114 may receive packet 1120. Next, interface circuit 1122 may de-encapsulate packet 1118 from packet 1120.

Then, interface circuit 1122 may provide packet 1120 to processor 1124 in services manager 114, which may execute a virtual Bluetooth device (VBD) 1126 application. This virtual Bluetooth device may have the capabilities of a physical Bluetooth radio. However, services manager 114 may not include a physical Bluetooth radio (and, thus, may not have dedicated hardware for the physical Bluetooth radio).

Virtual Bluetooth device 1126 may extract payload 1114 or contents of packet 1120, and may provide payload 1114 to an application 1128 executing on processor 1124. Note that application 1128 may correspond to Bluetooth application 1112. These applications may be vendor-specific or custom applications, e.g., they may be associated with a service provider.

Subsequently, application 1128 may provide a payload 1130 to virtual Bluetooth device 1126 along with an instruction to provide a packet 1132 that includes payload 1130 to the virtual Bluetooth gateway. Note that packet 1132 may be compatible with the Bluetooth communication protocol.

Then, interface circuit 1122 may encapsulate packet 1132 in a packet 1134, where packet 1134 has the IP-compatible format. Next, interface circuit 1122 may provide packet 1134 to electronic device 112-1 via access point 110-1, e.g., using the MQTT communication protocol.

After receiving packet 1134, the instance of the virtual Bluetooth gateway in access point 110-1 may de-encapsulate packet 1132 from 1134. Moreover, access point 110-1 may provide packet 1132 to electronic device 112-1, e.g., using the Bluetooth communication protocol. Furthermore, after receiving packet 1132, interface circuit 1116 may provide payload 1130 to Bluetooth application 1112 executing on processor 1110.

While FIG. 11 illustrates communication between components using unidirectional or bidirectional communication with lines having single arrows or double arrows, in general the communication in a given operation in this figure may involve unidirectional or bidirectional communication.

Figure 12:
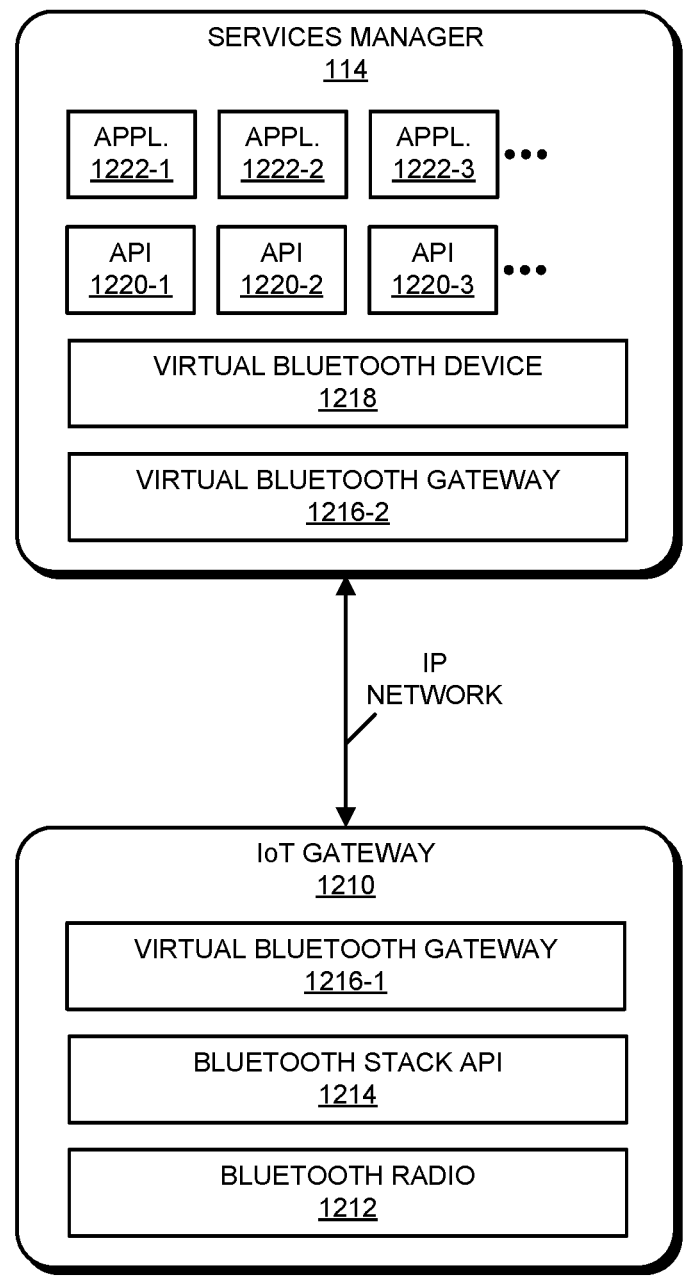
FIG. 12 is a block diagram illustrating an example of communication among electronic devices in accordance with an embodiment of the present disclosure.

FIG. 12 presents a block diagram illustrating an example of communication among electronic devices. In FIG. 12, an IoT gateway 1210 (which may be included in one of access points 110 in FIG. 1) may include: a Bluetooth radio 1212, a Bluetooth stack API 1214 and virtual Bluetooth gateway 1216-1. Bluetooth radio 1212 may receive a first packet that is compatible with a Bluetooth communication protocol using the Bluetooth communication protocol, e.g., from one of electronic devices 112 (FIG. 1). Then, Bluetooth radio 1212 may provide the first packet to virtual Bluetooth gateway 1216-1 via Bluetooth stack API 1214.

Virtual Bluetooth gateway 1212 may encapsulate the first packet in a second packet that have an IP-compatible format. Then, virtual Bluetooth gateway 1216-1 may provide the second packet to services manager 114 e.g., using a MQTT communication protocol.

Moreover, in FIG. 12, services manager 114 may include: virtual Bluetooth gateway 1216-2, virtual Bluetooth device 1218 (which is sometimes referred to as a virtual radio interface), APIs 1220, and applications 1222. After receiving the second packet, virtual Bluetooth gateway 1216-2 may de-encapsulate the first packet from the second packet. Then, virtual Bluetooth gateway 1216-2 may provide the first packet to virtual Bluetooth device 1218. Virtual Bluetooth device 1218 may provide a payload or contents of the first packet to one of applications 1222 (such as application 1222-1) via a corresponding one of APIs 1220 (such as API 1220-1).

Moreover, application 1222-1 may provide a payload to virtual Bluetooth device 1218 via API 1220-1, which provides a third packet that includes the payload to virtual Bluetooth gateway 1216-2. Note that the third packet that may be compatible with the Bluetooth communication protocol. Virtual Bluetooth gateway 1216-2 may encapsulate the third packet in a fourth packet that has the IP-compatible format. Then, virtual Bluetooth gateway 1216-2 may provide the fourth packet to IoT gateway 1210, e.g., using the MQTT communication protocol.

Furthermore, virtual Bluetooth gateway 1216-1 may receive the fourth packet. Then, virtual Bluetooth gateway 1216-1 may de-encapsulate the third packet from the fourth packet. Next, virtual Bluetooth gateway 1216-1 may provide the third packet to Bluetooth radio 1210 via Bluetooth stack API 1212. Furthermore, Bluetooth radio 1210 may provide the third packet using the Bluetooth communication protocol, e.g., to one of electronic devices 112 (FIG. 1).

In some embodiments, the communication techniques may provide a virtual Bluetooth gateway. Because more than 60% of IoT devices in the market are enabled with 'Bluetooth Smart' or 'Bluetooth Smart Ready,' there is need to have a generic technique for BLE-to-IP packet translation to expand the BLE range.

However, many systems have their own customized way of talking to BLE devices, which is incompatible with other systems or BLE devices. Consequently, there is a need for a common BLE-to-IP translation technique that can be used for a wide variety of different types of BLE devices. This capability may enable non-BLE enabled devices to communicate with BLE devices via IP translation. In the discussion that follows communication of Bluetooth packets over an IP network is described (as opposed to IP transport over a Bluetooth network).

Bluetooth is the most deployed IoT technology to date because of its low energy consumption and the availability of a large number of Bluetooth-enabled master devices (e.g., smartphones, gateways, etc.) in the market. This is in spite of the limited range of Bluetooth, which limits its usage when devices are far apart or isolated.

As a result of this problem, there are many Bluetooth-enabled IoT gateways and BLE transmitters/relay devices, which receive/send BLE packets from/to remote system (such as a cloud-based management system or a local site server).

When a remote system is programmed and provisioned to communicate with a Bluetooth-enabled device via an IoT gateway, it typically defines the architecture and protocol of the messages (such as a packet). An application using these definitions may communicate with the IoT gateway, which in turn may decrypt the packet using the same protocol definitions.

In the disclosed embodiments of the communication techniques, GAP and GATT packet translation may be performed in such a way that a virtual GATT client/server (which is sometimes referred to as a 'virtual Bluetooth gateway') may be implemented in a services manager even when the services manager does not have BLE communication capability (e.g., the services manager may not include a physical Bluetooth radio), although the translation component(s) in the services manager need to include the BLE capabilities of the physical Bluetooth radio.

Notably, in the disclosed embodiments of the communication techniques, an instance of a local Bluetooth interface (which is sometimes referred to as a 'virtual Bluetooth device') may be included in the services manager to allow the services manager to communicate with a remote BLE device. The virtual Bluetooth device may use standard Bluetooth translation (e.g., a lower level driver in layer 2 and layer 3 or data link and network layer of the Open Systems Interconnection or OSI model), so that the virtual Bluetooth gateway can understand BLE packets without any knowledge of IP-translation technique used to encapsulate the BLE packets.

During operation, a virtual Bluetooth gateway in an access point may receive a BLE packet from an electronic device using BLE communication. Then, the virtual Bluetooth gateway may encapsulate the BLE packet in a JSON packet, which is provided to the services manager. In the services manager, a virtual Bluetooth gateway may de-encapsulate the BLE packet from the JSON packet, and the virtual Bluetooth device may extract a payload or contents from the BLE packet. Note that the encapsulation and the providing, and the receiving and the de-encapsulation may be performed in layer 4 or transport layer of the OSI model.

Moreover, these operations may be performed in reverse. Notably, a payload may be provided to the virtual Bluetooth device in the services manager, which provides a BLE packet that includes the payload to the virtual Bluetooth gateway. The virtual Bluetooth gateway may encapsulate the BLE packet in a JSON packet, which is provided to the access point.

Next, the access point may de-encapsulate the BLE packet from the JSON packet, and the BLE packet may be provided to the electronic device using BLE communication.

The problem with existing approaches (prior to the disclosed embodiments of the communication techniques) is that it is often difficult to understand the top-level protocol definition running on a remote system before talking to a BLE device or a BLE-enabled IoT gateway. Stated different, the existing approach do not implement IP translation. Instead, they use encryption and decryption of packets based on custom definitions.

The disclosed embodiments of the communication techniques avoid this approach and provide several advantages. Notably, the communication techniques may ensure that GAP and GATT packets keep their true form irrespective of where they're used. Therefore, a communicating party/entity that understands BLE can work with these packets at a remote system, translator device or end device.

Moreover, there may not be unique/static definition/translation of packets for a BLE device. For example, if there is a vendor-A light bulb, a vendor-B light bulb or a vendor-C blood pressure monitor, the control packets for each of these BLE devices may remain constant and uniform in the embodiments of the communication techniques.

Furthermore, the communication techniques may provide a platform-independent technique for BLE communication end-to-end from a remote application or system to a BLE end device. While control message or IP packets over BLE may be implemented in multiple different types of implementations, the communication techniques may ensure there is one common implementation for the IP Layer.

Additionally, the use of the JSON format may ensure that integration system has several options for the IP communication protocol (e.g., MQTT).

The communication techniques may also avoid recurring and redundant middle-layer development for communication with a given device. Instead, in the communication techniques the responsibility is placed on the end-system developers. (e.g., in a remote system application or in the BLE end-device firmware).

Figure 13:
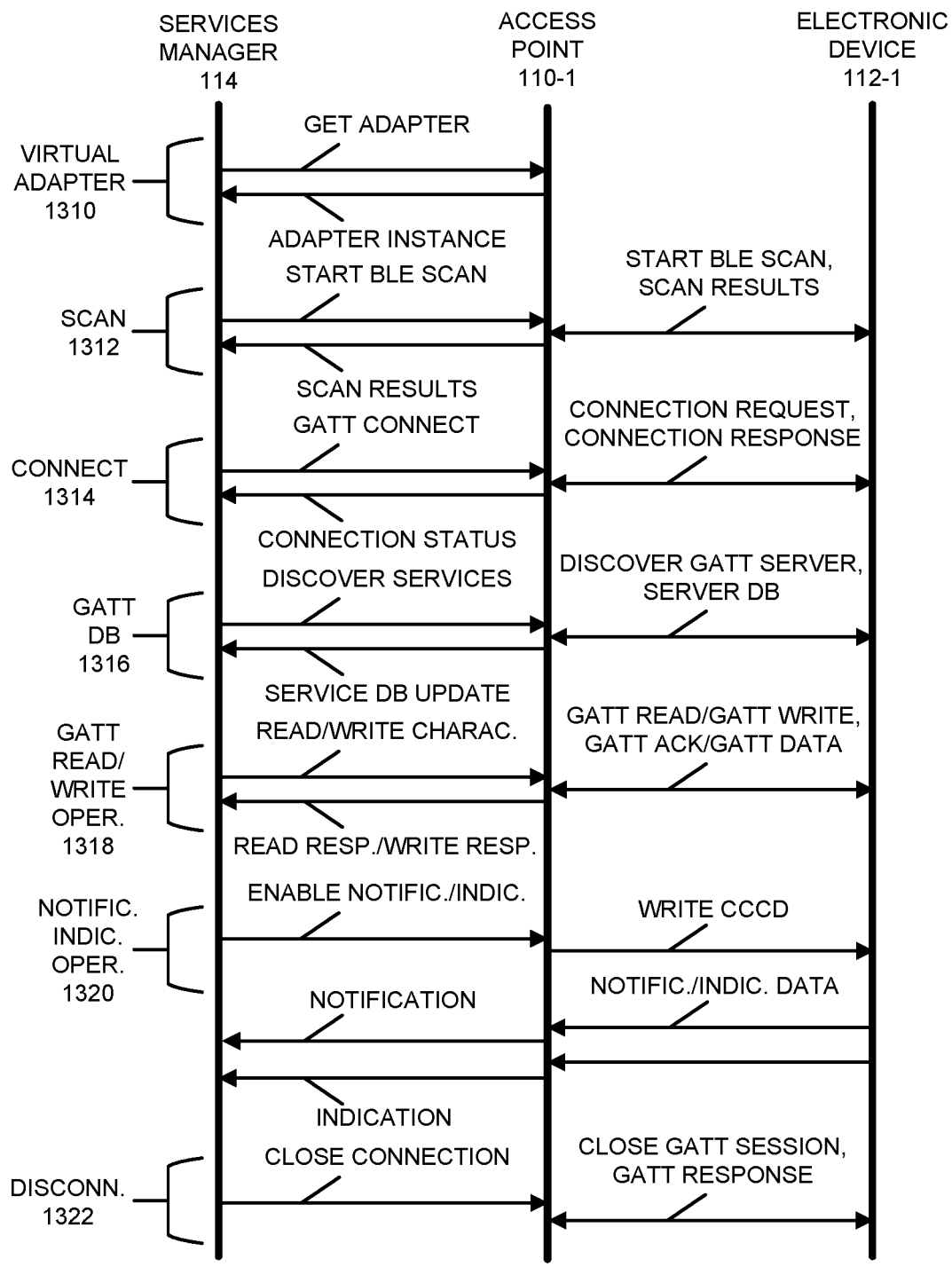
FIG. 13 is a block diagram illustrating an example of communication among electronic devices in accordance with an embodiment of the present disclosure.

FIG. 13 presents a block diagram illustrating an example of communication among electronic device 112-1, access point 110-1 and services manager 114. Notably, FIG. 13 illustrates a flow of BLE end-to-end communication and operation of a GATT software development kit (SDK). In particular, a virtual adapter 1310 may be created by services manager 114 providing a get-adapter command to access point 110-1 and then access point 110-1 may provide an adapter-instance response to services manager 114.

Then, access point 110-1 may scan 1312 for a BLE device. Notably, services manager 114 may provide a start-BLE scan command to access point 110-1, which performs a BLE scan and provides scan results to services manager 114.

Moreover, access point 110-1 may connect 1314 to electronic device 112-1. This may include: establishing a connection security configuration, performing a GATT connect, optionally maintaining the GATT adapter, and/or optionally performing a connection parameter handshake. For example, services manager 114 may provide a GATT-connect command to access point 110-1, which provides a connection-request command to electronic device 112-1. After receiving a connection response from electronic device 112-1, access point 110-1 may provide a connection status with the GATT adapter to services manager 114.

Next, access point 110-1 may discover a GATT database (DB) 1316. This may include: discovering services, optionally discovering characteristics, and/or optionally discovering a descriptor. For example, services manager 114 may provide a discover-services command to access point 110-1, which provides a discover-GATT-server command to electronic device 112-1. After receiving a server-database response from electronic device 112-1, access point 110-1 may provide a server-database update to services manager 114.

Furthermore, access point 110-1 may perform GATT read/write operation 1318. This may include: obtaining read characteristics, and/or obtaining reliable write characteristics. For example, services manager 114 may provide a read/write characteristics command to access point 110-1, which provides a GATT-read/GATT-write command to electronic device 112-1. After receiving a GATT-acknowledgment (ACK)/GATT-data response from electronic device 112-1, access point 110-1 may provide a read response/write response to services manager 114.

Additionally, a notification and an indication 1320 may be provided to services manager 114. This may include: setting characteristics notification/indication, and/or optionally obtaining an optional read/write descriptor. Notably, services manager 114 may provide an enable notification/indication command to access point 110-1, which provide a write client characteristic configuration descriptor (CCCD) to electronic device 112-1. In response, electronic device 112-1 may provide notification/indication data to access point 110-1, which provides the notification and/or the indication to services manager 114.

Moreover, access point 110-1 may disconnect 1322 with electronic device 112-1 or close the GATT connection. Notably, services manager 114 may provide a close-connection command to access point 110-1, which may provide a close-GATT-session command to electronic device 112-1. Then, electronic device may provide a GATT response to access point 110-1.

We now describe a set of vendor-independent Bluetooth operations that facilitate communication with a vendor-specific Bluetooth application. Table 1 presents services manager-access point (or gateway) communication MQTT topics and JSON payloads.

TABLE 1

| Operation | Topic | Payload | Data Type |
|---|---|---|---|
| Create virtual adapter | Services manager/GATT SDK/commands | { "gateway_id": "<gateway mac>", "command": "GET_ADAPTER" } | Gateway identifier, e.g., MAC address of access point |
| Reset Bluetooth radio | Services manager/GATT SDK/commands | { "gateway_id": "<gateway mac>", "network_mac": "<radio mac>", } | Gateway identifier, e.g., MAC address of access point |
| Start scan | Services manager/GATT SDK/commands | { "gateway_id": "<gateway mac>", "network_mac": "<radio mac>", "command": "START_SCAN", "cmd_args":[{ "scan_interval": <interval>, "scan_window": <duration> "scan_dur": <scan duration>, "scan_filter":[{ "dev_addr":"<addr>", "rssi": <rssi value>, "uuid":"UUID", "gap_name": " Name" }] "scan_mode": "<discover mode>"]} } | Network MAC, e.g., BLE radio MAC address Scan interval Scan window Scan duration Device address RSSI UUID GAP name Scan mode |
| Device join | Services manager/GATT SDK/commands | { "gateway_id": "<gateway mac>", "network_mac": "<radio mac>", "command": "PERMIT_DEVICE", "cmd_args":[{ "dev_addr": "<addr>" }], } | Gateway identifier Network MAC address Device address |

TABLE 1-continued

| Operation | Topic | Payload | Data Type |
|---|---|---|---|
| Pin pairing | Services manager/GATT SDK/commands | {<br>"gateway_id": "<gateway mac>",<br>"network_mac": "<radio mac>",<br>"command": "CONFIGURE_BTSM",<br>"cmd_args":[{<br>"sec_flag": <bitmask>,<br>"io_cap": <io capability><br>}],<br>} | Gateway identifier Network MAC address Security flag Input/output capability |
| Connect | Services manager/GATT SDK/commands | {<br>"gateway_id": "<gateway mac>",<br>"network_mac": "<radio mac>",<br>"command": "CONNECT_DEVICE",<br>"cmd_args":{[<br>"dev_addr": "<dev addr>",<br>"addr_type": "<Addr type>",<br>"passkey": "<Pass key>"<br>"autoconnect": "<0/1>"<br>"mobile": "<0/1>"<br>]},<br>} | Address type Passkey, e.g., an AES encrypted passcode |
| Connect On | Services manager/GATT SDK/commands | {<br>"gateway_id": "<gateway mac>",<br>"network_mac": "<radio mac>",<br>"command": "CONNECT_DEVICE",<br>"cmd_args": {[<br>"dev_addr": "<dev addr>",<br>"addr_type": "<Addr type>",<br>"passkey": "<Pass key>",<br>"autoconnect": "<0/1>",<br>"mobile": "<0/1>",<br>"adv_type": <Advertisement Data type>,<br>"adv_data": <Advertisement Data ><br>]},<br>} | Address type Passkey, e.g., an AES encrypted passcode |
| Stop scan | Services manager/GATT SDK/commands | {<br>"gateway_id": "<gateway mac>",<br>"network_mac": "<radio mac>",<br>"command": "STOP_SCAN",<br>} | Gateway identifier Network MAC address |
| Get RSSI | Services manager/GATT SDK/commands | {<br>"gateway_id": "<gateway mac>",<br>"network_mac": "<radio mac>",<br>"command": "GET_RSSI",<br>"cmd_args": {[<br>"dev_addr": "<dev addr>",<br>"conn_handle": <Handle><br>]},<br>} | Gateway identifier Network MAC address Device address Connection handle |
| Discover services | Services manager/GATT SDK/commands | {<br>"gateway_id": "<gateway mac>",<br>"network_mac": "<radio mac>",<br>"command": "DISCOVER_SERVICES",<br>"cmd_args":[{<br>"dev_addr": "<dev addr>",<br>"conn_handle": <Handle><br>}]<br>} | Gateway identifier Network MAC address Device address Connection handle |
| Read characteristics | Services manager/GATT SDK/commands | {<br>"gateway_id": "<gateway mac>",<br>"network_mac": "<radio mac>",<br>"command": "READ_CHAR",<br>"cmd_args":[{<br>"dev_addr": "<dev addr>",<br>"conn_handle": <Handle>,<br>"char_uuid": <Char UUID>,<br>"char_handle": <CharHandle><br>}]<br>} | Gateway identifier Network MAC address Device address Connection handle Characteristic handle |

TABLE 1-continued

| Operation | Topic | Payload | Data Type |
|---|---|---|---|
| Write characteristics | Services manager/GATT SDK/commands | { "gateway_id": "<gateway mac>", "network_mac": "<radio mac>", "command": "WRITE_CHAR", "cmd_args":[{ "dev_addr": "<dev addr>", "conn_handle": <Handle>, "char_uuid": <Char UUID>, "char_handle": <Char Handle> "value": "<value>", "value_len": <Length>, "ack_flag": <flag> }] } | Gateway identifier Network MAC address Device address Connection handle Characteristic handle Value Value length Response flag |
| Set characteristic notification Set characteristic indication | Services manager/GATT SDK/commands | { "gateway_id": "<gateway mac>", "network_mac": "<radio mac>", "command": "SET_NOTIFICATION", "cmd_args":[{ "dev_addr": "<dev addr>", "conn_handle": <Handle>, "char_handle": <CharHandle> "char_uuid": <Char UUID>, "notif_flag": <flag> }] } | Gateway identifier Network MAC address Connection handle Characteristic handle Action flag |
| Close connection | Services manager/GATT SDK/commands | { "gateway_id": "<gateway mac>", "network_mac": "<radio mac>", "command": "CLOSE_CONNECTION", "cmd_args":[{ "dev_addr": "<dev addr>", "conn_handle": <Handle>, }] } | Gateway identifier Network MAC address Device address Connection handle |

Moreover, Table 2 presents access point (or gateway)-services manager communication MQTT topics and JSON payloads.

TABLE 2

| Operation | Topic | Payload | Data Type |
|---|---|---|---|
| Create virtual adapter | Gateway/GATT SDK adapter | { "gateway_id": "<gateway mac>", "cmd_opcode": "GET_ADAPTER", "cmd_args":[{ "network_mac": "<radio mac>" }] } | Gateway identifier Network MAC address |
| Start scan | Gateway/GATT SDK/scan | { "gateway_id": "<gateway mac>", "network_mac": "<radio mac>", "cmd_opcode": "START_SCAN", "cmd_args":[{ "result": <result code> "packet_dump": "<ADV pkt dump>", "packet_type": <ADV pkt type> "dev_addr": "<device addr>", "addr_type": "<addr_type>", "rssi": <RSSI val>" }]} } | Gateway identifier Network MAC address Packet dump Packet type Device address Address type RSSI |

TABLE 2-continued

| Operation | Topic | Payload | Data Type |
|---|---|---|---|
| Device join | Gateway/GATT SDK/authentication | {<br>"gateway_id": "<gateway mac>",<br>"network_mac": "<radio mac>",<br>"cmd_opcode": "PERMIT_DEVICE",<br>"cmd_args":[{<br>"dev_addr": "<addr>",<br>"result": <result code><br>]},<br>} | Gateway identifier<br>Network MAC address<br>Device address |
| Pin pairing | Gateway/GATT SDK/btsm | {<br>"gateway_id": "<gateway mac>",<br>"network_mac": "<radio mac>",<br>"cmd_opcode": "CONFIGURE_BTSM",<br>"cmd_args":[{<br>"result": <result code><br>]},<br>} | Gateway identifier<br>Network MAC address<br>Result |
| Connect | Gateway/GATT SDK/BLE connect | {<br>"gateway_id": "<gateway mac>",<br>"network_mac": "<radio mac>",<br>"cmd_opcode": "CONNECT_DEVICE",<br>"cmd_args":[{<br>"conn_handle": <Handle>,<br>"dev_addr": "<addr>",<br>"mobile": "<0/1>"<br>"result": <result code><br>]},<br>} | Gateway identifier<br>Network MAC address<br>Result<br>Connection handle |
| Stop scan | Gateway/GATT SDK/scan | {<br>"gateway_id": "<gateway mac>",<br>"network_mac": "<radio mac>",<br>"cmd_opcode": "STOP_SCAN",<br>"cmd_args":[{<br>"result": <result code><br>]},<br>} | Gateway identifier<br>Network MAC address<br>Result |
| Get RSSI | Gateway/GATT SDK/RSSI | {<br>"gateway_id": "<gateway mac>",<br>"network_mac": "<radio mac>",<br>"cmd_opcode": "GET_RSSI",<br>"cmd_args":[{<br>"dev_addr": "<dev addr>",<br>"conn_handle": <Handle>,<br>"result": <result code>,<br>"rssi": <rssi value><br>]},<br>} | Gateway identifier<br>Network MAC address<br>Connection handle |
| Discover services | Gateway/GATT SDK/services | {<br>"gateway_id": "<gateway mac>",<br>"network_mac": "<radio mac>",<br>"cmd_opcode": "DISCOVER_SERVICES",<br>"cmd_args":[{<br>"dev_addr": "<dev addr>",<br>"conn_handle": <Handle>,<br>"result": <result code><br>"service_handle":<handle>,<br>"service_uuid":<uuid>,<br>"characteristics":[{<br>"char_handle": <handle>,<br>"properties": "<props>",<br>"char_uuid": "<uuid>"<br>},{<br>"char handle": <handle>,<br>"properties": "<props>",<br>"char_uuid": "<uuid>"<br>}],<br>}]<br>} | Gateway identifier<br>Network MAC address<br>Connection handle<br>Service handle<br>Service UUID<br>Characteristic handle<br>Characteristic UUID |

TABLE 2-continued

| Operation | Topic | Payload | Data Type |
|---|---|---|---|
| GATT procedure complete | Gateway/GATT SDK/services | { "gateway_id": "<gateway mac>", "network_mac": "<radio mac>", "cmd_opcode": "DISCOVER_SERVICES", "cmd_args":[{ "conn_handle": <Handle>, "dev_addr":"addr", "result":<error_code>, "att_opcode":"gatt_procedure_complete" }] } | Gateway identifier Network MAC address Device address Att opcode |
| Read characteristics GATT service-manager notification GATT service-manager indication | Gateway/GATT SDK/character. | { "gateway_id": "<gateway mac>", "network_mac": "<radio mac>", "cmd_opcode": "READ_CHAR", "cmd_args":[{ "conn_handle": <Handle>, "dev_addr": "<dev addr>", "result": <result code>, "char_handle": <handle>, "att_opcode": <Opcode>, "value":"<char value>" }] } | Gateway identifier Network MAC address Connection handle Characteristic handle Value ATT opcode |
| Write characteristic | Gateway/GATT SDK/write | { "gateway_id": "<gateway mac>", "network_mac": "<radio mac>", "command": "WRITE_CHAR", "cmd_args":[{ "conn_handle": <Handle>, "result": <result code>, "ack_flag": <0/1> }] } | Gateway identifier Network MAC address Connection handle Result |
| Set characteristic notification Set characteristic indication | Gateway/GATT SDK/notific. | { "gateway_id": "<gateway mac>", "network_mac": "<radio mac>", "command": "SET_NOTIFICATION", "cmd_args":[{ "dev_addr": "<dev addr>", "conn_handle": <Handle>, "result": <result code>, "notif_flag": <0/1> "char_handle": <Char Handle> }] } | Gateway identifier Network MAC address Result Characteristic handle Notification flag |
| Close connection | Gateway/GATT SDK/connect. | { "gateway_id": "<gateway mac>", "network_mac": "<radio mac>", "command": "CLOSE_CONNECTION", "cmd_args":[{ "dev_addr": "<dev addr>", "conn_handle": <Handle>, "action_flag": <0/1> "result": <result code> }] } | Gateway identifier Network MAC address Connection handle Action flag Result |

We now describe embodiments of an electronic device, which may perform at least some of the operations in the communication techniques. FIG. 14 presents a block diagram illustrating an example of an electronic device 1400 in accordance with some embodiments, such as one of access points 110, electronic devices 112, services manager 114 or computers 116. This electronic device includes processing subsystem 1410, memory subsystem 1412, and networking subsystem 1414. Processing subsystem 1410 includes one or more devices configured to perform computational operations. For example, processing subsystem 1410 can include one or more microprocessors, ASICs, microcontrollers, programmable-logic devices, one or more graphics processing units, and/or one or more digital signal processors (DSPs).

Memory subsystem 1412 includes one or more devices for storing data and/or instructions for processing subsystem 1410 and networking subsystem 1414. For example, memory subsystem 1412 can include dynamic random access memory (DRAM), static random access memory (SRAM), and/or other types of memory. In some embodiments, instructions for processing subsystem 1410 in memory subsystem 1412 include: one or more program modules or sets of instructions (such as program instructions 1422 or operating system 1424), which may be executed by processing subsystem 1410. Note that the one or more computer programs or program instructions may constitute a computer-program mechanism. Moreover, instructions in the various modules in memory subsystem 1412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1410.

In addition, memory subsystem 1412 can include mechanisms for controlling access to the memory. In some embodiments, memory subsystem 1412 includes a memory hierarchy that comprises one or more caches coupled to a memory in electronic device 1400. In some of these embodiments, one or more of the caches is located in processing subsystem 1410.

In some embodiments, memory subsystem 1412 is coupled to one or more high-capacity mass-storage devices (not shown). For example, memory subsystem 1412 can be coupled to a magnetic or optical drive, a solid-state drive, or another type of mass-storage device. In these embodiments, memory subsystem 1412 can be used by electronic device 1400 as fast-access storage for often-used data, while the mass-storage device is used to store less frequently used data.

Networking subsystem 1414 includes one or more devices configured to couple to and communicate on a wired and/or wireless network (i.e., to perform network operations), including: control logic 1416, an interface circuit 1418, an optional cable 1406 and one or more antennas 1420 (or antenna elements), which may be included in an optional antenna module 1430. (While FIG. 14 includes antenna module 1430, in some embodiments electronic device 1400 includes one or more nodes, such as nodes 1408, e.g., a pad, which can be coupled to antenna module 1430. Thus, electronic device 1400 may or may not include antenna modules 1430. Note that the one or more nodes 1408 may constitute input(s) to and/or output(s) from electronic device 1400.) For example, networking subsystem 1414 can include a Bluetooth™ networking system, a BLE networking system, a cellular networking system (e.g., a 3G/4G/5G network such as UMTS, LTE, etc.), a universal serial bus (USB) networking system, a networking system based at least in part on the standards described in IEEE 802.11 (e.g., a Wi-Fi® networking system), an Ethernet networking system, a Zigbee networking system, a Z-Wave networking system, a LoRaWAN networking system and/or another networking system.

Note that a transmit or receive antenna pattern (or antenna radiation pattern) of electronic device 1400 may be adapted or changed using pattern shapers (such as reflectors) in one or more antennas 1420 (or antenna elements), which can be independently and selectively electrically coupled to ground to steer the transmit antenna pattern in different directions. Thus, if one or more antennas 1420 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1400 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1400 may use the mechanisms in networking subsystem 1414 for performing simple wireless communication between the electronic devices, e.g., transmitting advertising or beacon frames and/or scanning for advertising frames transmitted by other electronic devices as described previously.

Within electronic device 1400, processing subsystem 1410, memory subsystem 1412, and networking subsystem 1414 are coupled together using bus 1428. Bus 1428 may include an electrical, optical, and/or electro-optical connection that the subsystems can use to communicate commands and data among one another. Although only one bus 1428 is shown for clarity, different embodiments can include a different number or configuration of electrical, optical, and/or electro-optical connections among the subsystems.

In some embodiments, electronic device 1400 includes a display subsystem 1426 for displaying information on a display, which may include a display driver and the display, such as a liquid-crystal display, a multi-touch touchscreen, etc.

Electronic device 1400 can be (or can be included in) any electronic device with at least one network interface. For example, electronic device 1400 can be (or can be included in): an IoT device, a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1400, in alternative embodiments, different components and/or subsystems may be present in electronic device 1400. For example, electronic device 1400 may include one or more additional processing subsystems, memory subsystems, networking subsystems, and/or display subsystems. Additionally, one or more of the subsystems may not be present in electronic device 1400. Moreover, in some embodiments, electronic device 1400 may include one or more additional subsystems that are not shown in FIG. 14. Also, although separate subsystems are shown in FIG. 14, in some embodiments some or all of a given subsystem or component can be integrated into one or more of the other subsystems or component(s) in electronic device 1400. For example, in some embodiments program instructions 1422 is included in operating system 1424 and/or control logic 1416 is included in interface circuit 1418.

Moreover, the circuits and components in electronic device 1400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1414. The integrated circuit may include hardware and/or software mechanisms that are used for transmitting wireless signals from electronic device 1400 and receiving signals at electronic device 1400 from other electronic devices. Aside from the mechanisms herein described, radios are generally known in the art and hence are not described in detail. In general, networking subsystem 1414 and/or the integrated circuit can include any number of radios. Note that the radios in multiple-radio embodiments function in a similar way to the described single-radio embodiments.

In some embodiments, networking subsystem 1414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used BLE, Ethernet, MQTT and a Wi-Fi communication protocols as illustrative examples, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1422, operating system 1424 (such as a driver for interface circuit 1418) or in firmware in interface circuit 1418. Note that the communication techniques may occur while processing system 1410 executes program instructions 1422. Thus, the communication techniques may be implemented at runtime of program instructions 1422. Alternatively or additionally, at least some of the operations in the communication techniques may be implemented in a physical layer, such as hardware in interface circuit 1418.

Moreover, while the preceding discussion illustrated embodiments of the communication techniques in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA). In some embodiments, wireless communication in the preceding embodiments occurs in a frequency band associated with the Citizens Band Radio Service or CBRS (e.g., a frequency band near 3.5 GHz). However, different frequency band(s) may be used. For example, the wireless signals may be communicated in one or more bands of frequencies, including: 900 MHz, 2.4 GHz, 5 GHz, 6 GHz, 60 GHz, and/or a band of frequencies used by LTE or another cellular-telephone communication protocol or data communication protocol.

Furthermore, the functionality of electronic device 1400 may be implemented using a single electronic device or a group of electronic devices, which may be located at a single location or which may be distributed at disparate geographic locations (such as a cloud-based computing system).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a network node;
   an interface circuit, communicatively coupled to the network node, configured to communicate with a second electronic device;
   a processor coupled to the interface circuit; and
   memory, coupled to the processor, configured to store program instructions, wherein, when executed by the processor, the program instructions cause the electronic device to perform operations associated with a virtual Bluetooth gateway, comprising:

receiving a first packet associated with the second electronic device and that has an Internet Protocol (IP)-compatible format;

de-encapsulating a second packet from the first packet, wherein the second packet is compatible with a Bluetooth communication protocol, and wherein the de-encapsulating is performed in a transport layer in a software stack, which is above a driver layer and a data layer in the software stack that are associated with the Bluetooth communication protocol; and providing, addressed to a given destination electronic device, the second packet using the Bluetooth communication protocol, wherein the receiving, the de-encapsulating and the providing provide a common protocol for handling communication of traffic to different destination electronic devices, which comprise the given destination electronic device and are associated with different service providers, wherein the communication of the traffic to the given destination electronic device excludes encryption and decryption based on custom definitions of the second packet to a service-provider-specific Bluetooth application associated with the given destination electronic device, and wherein the first packet comprises a service-provider-independent packet and the second packet is intended for the service-provider-specific Bluetooth application and comprises a service-provider-specific generic access profile (GAP) packet or a generic attribute profile (GATT) packet.

2. The electronic device of claim 1, wherein the electronic device does not comprise a physical Bluetooth radio.

3. The electronic device of claim 2, wherein the electronic device comprises a virtual Bluetooth device that communicates with the second electronic device via the virtual Bluetooth gateway; and wherein the virtual Bluetooth device has the capabilities of a physical Bluetooth radio.

4. The electronic device of claim 1, wherein the first packet has a JavaScript Object Notation (JSON) format.

5. The electronic device of claim 1, wherein the operations comprise:

receiving a third packet that is compatible with the Bluetooth communication protocol;

encapsulating the third packet in a fourth packet that has the IP-compatible format, wherein the encapsulating is performed in the transport layer in the software stack; and providing the fourth packet addressed to the second electronic device.

6. The electronic device of claim 1, wherein the virtual Bluetooth gateway is configured to support a set of service-provider-independent Bluetooth operations.

7. The electronic device of claim 6, wherein the virtual Bluetooth gateway provides application programming interfaces (APIs) for the set of service-provider-independent Bluetooth operations that facilitate communication with the service-provider-specific Bluetooth application; and wherein the operations comprise remote discovering of characteristics and attributes of the second electronic device via the APIs.

8. The electronic device of claim 1, wherein the Bluetooth communication protocol comprises Bluetooth Low Energy (BLE).

9. The electronic device of claim 1, wherein the first packet is communicated using a Message Queuing Telemetry Transport (MQTT).

10. A non-transitory computer-readable storage medium for use in conjunction with an electronic device, the computer-readable storage medium storing program instructions that, when executed by the electronic device, cause the electronic device to perform operations associated with a virtual Bluetooth gateway comprising:

receiving a first packet associated with a second electronic device and that has an Internet Protocol (IP)-compatible format;

de-encapsulating a second packet from the first packet, wherein the second is compatible with a Bluetooth communication protocol, and wherein the de-encapsulating is performed in a transport layer in a software stack, which is above a driver layer and a data layer in the software stack that are associated with the Bluetooth communication protocol; and providing, addressed to a given destination electronic device, the second packet using the Bluetooth communication protocol, wherein the receiving, the de-encapsulating and the providing provide a common protocol for handling communication of traffic to different destination electronic devices, which comprise the given destination electronic device and are associated with different service providers, wherein the communication of the traffic to the given destination electronic device excludes encryption and decryption based on custom definitions of the second packet to a service-provider-specific Bluetooth application associated with the given destination electronic device, and wherein the first packet comprises a service-provider-independent packet and the second packet is intended for the service-provider-specific Bluetooth application and comprises a service-provider-specific generic access profile (GAP) packet or a generic attribute profile (GATT) packet.

11. The non-transitory computer-readable storage medium of claim 10, wherein the electronic device does not comprise a physical Bluetooth radio.

12. The non-transitory computer-readable storage medium of claim 11, wherein the electronic device comprises a virtual Bluetooth device that communicates with the second electronic device via the virtual Bluetooth gateway; and wherein the virtual Bluetooth device has the capabilities of a physical Bluetooth radio.

13. The non-transitory computer-readable storage medium of claim 10, wherein the first packet has a JavaScript Object Notation (JSON) format.

14. The non-transitory computer-readable storage medium of claim 10, wherein the operations comprise:

receiving a third packet that is compatible with the Bluetooth communication protocol;

encapsulating the third packet in a fourth packet that has the IP-compatible format, wherein the encapsulating is performed in the transport layer in the software stack; and providing the fourth packet addressed to the second electronic device.

15. The non-transitory computer-readable storage medium of claim 10, wherein the virtual Bluetooth gateway is configured to support a set of service-provider-independent Bluetooth operations that facilitate communication with the service-provider-specific Bluetooth application;

wherein the virtual Bluetooth gateway provides application programming interfaces (APIs) for the set of service-provider-independent Bluetooth operations; and wherein the operations comprise remote discovering of characteristics and attributes of the second electronic device via the APIs.

16. A method for providing a virtual Bluetooth gateway, comprising:
by an electronic device:
receiving a first packet associated with a second electronic device and that has an Internet Protocol (IP)-compatible format;
de-encapsulating a second packet from the first packet, wherein the second is compatible with a Bluetooth communication protocol, and wherein the de-encapsulating is performed in a transport layer in a software stack, which is above a driver layer and a data layer in the software stack that are associated with the Bluetooth communication protocol; and
providing, addressed to a given destination electronic device, the second packet using the Bluetooth communication protocol, wherein the receiving, the de-encapsulating and the providing provide a common protocol for handling communication of traffic to different destination electronic devices, which comprise the given destination electronic device and are associated with different service providers, wherein the communication of the traffic to the given destination electronic device excludes encryption and decryption based on custom definitions of the second packet to a service-provider-specific Bluetooth application associated with the given destination electronic device, and
wherein the first packet comprises a service-provider-independent packet and the second packet is intended for the service-provider-specific Bluetooth application and comprises a service-provider-specific generic access profile (GAP) packet or a generic attribute profile (GATT) packet.

17. The method of claim 16, wherein the method comprises:
receiving a third packet that is compatible with the Bluetooth communication protocol;
encapsulating the third packet in a fourth packet that has the IP-compatible format, wherein the encapsulating is performed in the transport layer in the software stack; and
providing the fourth packet addressed to the second electronic device.

18. The method of claim 16, wherein the virtual Bluetooth gateway is configured to support a set of service-provider-independent Bluetooth operations that facilitate communication with the service-provider-specific Bluetooth application;
wherein the virtual Bluetooth gateway provides application programming interfaces (APIs) for the set of service-provider-independent Bluetooth operations; and
wherein the method comprises remote discovery of characteristics and attributes of the second electronic device via the APIs.

19. The method of claim 16, wherein the electronic device comprises a virtual Bluetooth device that communicates with the second electronic device via the virtual Bluetooth gateway; and
wherein the virtual Bluetooth device has the capabilities of a physical Bluetooth radio.

20. The method of claim 16, wherein the first packet has a JavaScript Object Notation (JSON) format.

* * * * *